United States Patent
Imai et al.

(10) Patent No.: US 9,800,629 B2
(45) Date of Patent: Oct. 24, 2017

(54) APPARATUS, SYSTEM, AND METHOD OF CONTROLLING TRANSMISSION OF DATA

(71) Applicants: Takuya Imai, Tokyo (JP); Kenichiro Morita, Tokyo (JP); Shoh Nagamine, Kanagawa (JP); Hideki Shiro, Kanagawa (JP)

(72) Inventors: Takuya Imai, Tokyo (JP); Kenichiro Morita, Tokyo (JP); Shoh Nagamine, Kanagawa (JP); Hideki Shiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 14/855,610

(22) Filed: Sep. 16, 2015

(65) Prior Publication Data

US 2016/0094594 A1    Mar. 31, 2016

(30) Foreign Application Priority Data

Sep. 29, 2014 (JP) .................................. 2014-197783
Sep. 9, 2015 (JP) .................................. 2015-177385

(51) Int. Cl.
*H04L 29/06* (2006.01)
*H04L 29/08* (2006.01)

(52) U.S. Cl.
CPC ........ *H04L 65/403* (2013.01); *H04L 65/1069* (2013.01); *H04L 67/327* (2013.01)

(58) Field of Classification Search
CPC ....... H04L 29/06; H04L 29/08; H04L 65/403; H04L 65/1069; H04L 67/327; H04M 11/00; G06F 13/00; H04N 7/15
See application file for complete search history.

(56) References Cited

U.S. PATENT DOCUMENTS 7,349,357 B1 * 3/2008 Luoma ................. H04N 21/235
    348/E5.005
7,460,493 B1 * 12/2008 Dhanoa ................ H04M 3/382
    348/14.08

(Continued)

FOREIGN PATENT DOCUMENTS

JP    2011-041153    2/2011
JP    2012-191598    10/2012

*Primary Examiner* — Tri H Phan
(74) *Attorney, Agent, or Firm* — Oblon, McClelland, Maier & Neustadt, L.L.P.

(57) ABSTRACT

A system stores, in a memory, first service identification information for identifying a service to be used by a first communication terminal that requests for content data, second service identification information for identifying a service to be used by a second communication terminal that transmits content data, and content data information indicating property of content data that can be transmitted to the first communication terminal, in association with one another. After a session for transmitting content data is established between the first communication terminal and the second communication terminal, the system controls transmission of content data from the second communication terminal to the first communication terminal, so as to transmit content data having a property indicated by the content data information that is stored in association with the first service identification information and the second service identification information.

12 Claims, 19 Drawing Sheets

(56) References Cited

U.S. PATENT DOCUMENTS

| | | | |
|---|---|---|---|
| 7,516,197 B1* | 4/2009 | Kataoka | G06F 17/30905 709/203 |
| 7,594,052 B2* | 9/2009 | Radulescu | H04L 45/00 710/105 |
| 8,850,033 B2* | 9/2014 | Umehara | H04L 12/1818 709/227 |
| 8,850,184 B2* | 9/2014 | Imai | H04L 63/0428 713/153 |
| 2002/0138589 A1* | 9/2002 | Al-Kazily | G06F 17/30902 709/217 |
| 2007/0162604 A1* | 7/2007 | Murakami | G06Q 40/00 709/226 |
| 2012/0221702 A1* | 8/2012 | Umehara | H04L 12/1818 709/223 |
| 2013/0242331 A1* | 9/2013 | Ando | H04N 1/0097 358/1.13 |
| 2014/0055555 A1* | 2/2014 | Imai | H04L 63/0428 348/14.09 |
| 2014/0118475 A1 | 5/2014 | Nagamine et al. | |
| 2014/0240450 A1 | 8/2014 | Morita et al. | |
| 2014/0244460 A1 | 8/2014 | Imai et al. | |
| 2014/0253979 A1* | 9/2014 | Sasaki | H04N 1/00225 358/474 |
| 2014/0354767 A1* | 12/2014 | Imai | H04L 63/0428 348/14.09 |
| 2014/0362718 A1 | 12/2014 | Nagamine et al. | |
| 2014/0368410 A1 | 12/2014 | Imai et al. | |
| 2015/0242312 A1* | 8/2015 | Ideue | G06F 9/3004 711/156 |
| 2017/0083697 A1* | 3/2017 | Hayashi | G06F 21/31 |

\* cited by examiner

FIG. 7A

AUTHENTICATION MANAGEMENT TABLE

| CONTACT ID | PASSWORD | SERVICE ID |
|---|---|---|
| 01aa | aaaa | 1001 |
| 01aa | aaaa | 1003 |
| 01aa | aaaa | 1005 |
| ... | ... | ... |
| 01db | dbdb | 1004 |
| ... | ... | ... |

FIG. 7B

TERMINAL MANAGEMENT TABLE

| CONTACT ID | COUNTERPART NAME (TERMINAL NAME) | OPERATING STATE | TERMINAL IP ADDRESS | SERVICE ID |
|---|---|---|---|---|
| 01aa | AA TERMINAL | ONLINE (COMMUNICATION OK) | 1.2.1.3 | 1005 |
| ... | ... | ... | ... | ... |
| 01ba | BA TERMINAL | ONLINE (COMMUNICATING) | 1.2.2.3 | 1003 |
| ... | ... | ... | ... | ... |
| 01cb | CB TERMINAL | OFFLINE | 1.3.1.4 | – |
| ... | ... | ... | ... | ... |
| 01db | CALL CENTER DB TERMINAL | ONLINE (COMMUNICATION OK) | 1.3.2.4 | 1004 |
| ... | ... | ... | ... | ... |

FIG. 7C

APPLICATION USE MANAGEMENT TABLE

| APPLICATION ID<br>CONTACT ID | a001 | a002 | a003 | a004 |
|---|---|---|---|---|
| 01aa | On | On | Off | Off |
| ... | ... | ... | ... | ... |
| 01db | On | On | Off | Off |
| ... | ... | ... | ... | ... |

FIG. 7D

SESSION MANAGEMENT TABLE

| SESSION ID | RELAY DEVICE ID | PARTICIPATING TERMINAL CONTACT ID |
|---|---|---|
| se1 | 111e | 01aa, 01db |
| se2 | 111b | 01da |
| ... | ... | ... |

FIG. 8A

SERVICE LIST MANAGEMENT TABLE

| SERVICE ID | SERVICE TYPE | FUNCTION |
|---|---|---|
| 1001 | Meeting | Presenter |
| 1002 | Meeting | Audience |
| 1003 | Meeting | Participant |
| 1004 | Reception | Operator |
| 1005 | Reception | Guest |
| 1006 | Monitoring | Camera |
| 1007 | Monitoring | Monitor |
| ... | ... | ... |

FIG. 8B

TRANSMISSION MANAGEMENT TABLE

| REQUEST SENDER SERVICE ID | DATA SENDER SERVICE ID | CONTENT |
|---|---|---|
| 1004 | 1005 | IMAGE DATA |
| 1004 | 1005 | SOUND DATA |
| 1005 | 1004 | IMAGE DATA/ RESOLUTION 640 × 360, FRAME RATE 30, BIT RATE 700 Kbps |
| 1005 | 1004 | SOUND DATA |
| ... | ... | APPLICATION DATA |
| ... | ... | STROKE DATA |
| ... | ... | STILL IMAGE DATA |
| ... | ... | ... |

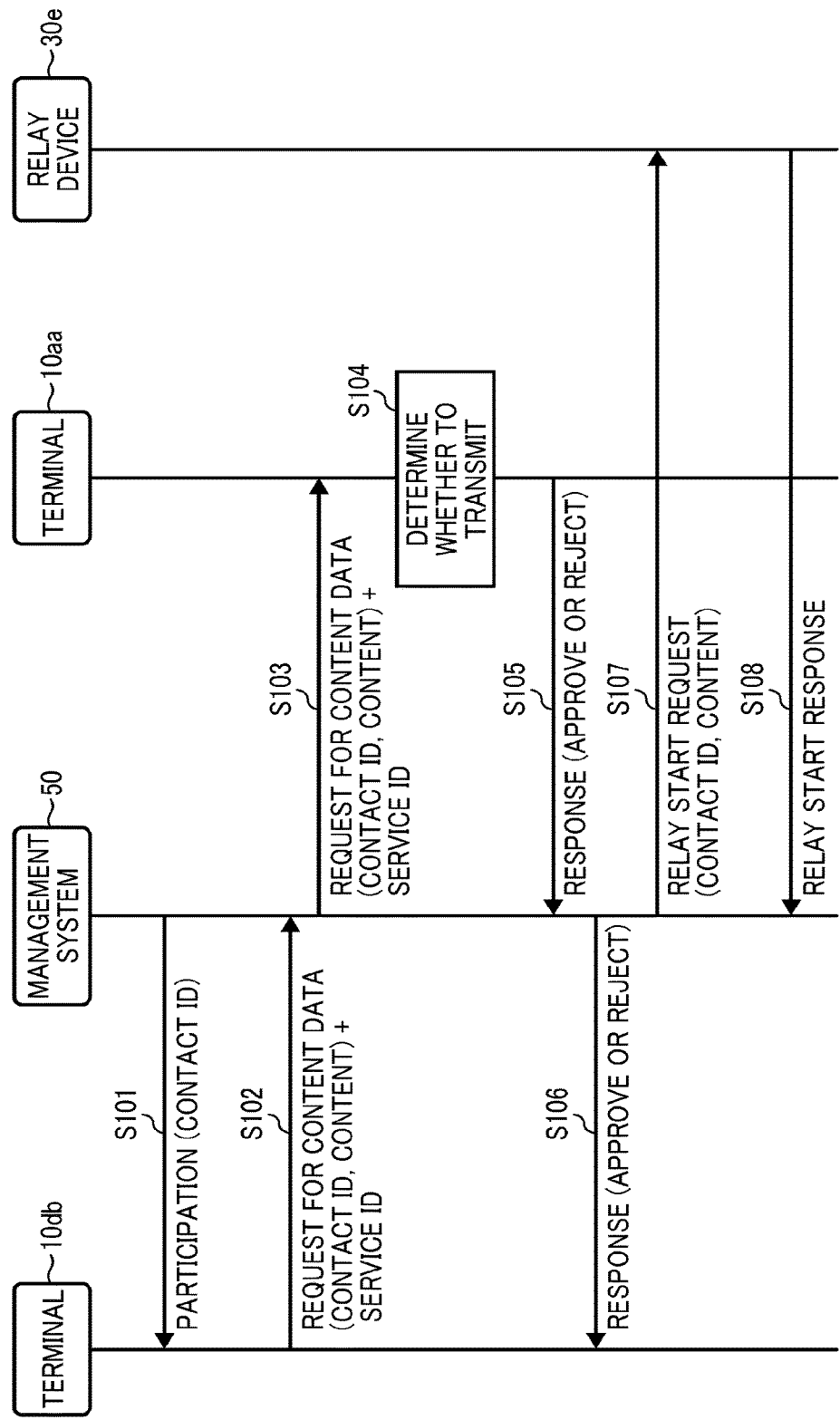

APPARATUS, SYSTEM, AND METHOD OF CONTROLLING TRANSMISSION OF DATA

CROSS-REFERENCE TO RELATED APPLICATIONS

This patent application is based on and claims priority pursuant to 35 U.S.C. §119(a) to Japanese Patent Application Nos. 2014-197783, filed on Sep. 29, 2014, and 2015-177385, filed on Sep. 9, 2015, in the Japan Patent Office, the entire disclosure of which is hereby incorporated by reference herein.

BACKGROUND

Technical Field

The present invention generally relates to managing transmission of content data from one communication terminal to the other communication terminal.

Description of the Related Art

With the increased need for reduction in business trip costs and time in recent years, communication systems that communicate via a communication network such as the Internet or a dedicated line are widely spread. In the communication systems, content data such as image data or sound data are transmitted or received among a plurality of communication terminals to carry out videoconference.

The communication systems may be used for providing various services including, for example, conversation, videoconference, lecture, reception, help desk, remote medical diagnosis system, and remote monitoring.

SUMMARY

Example embodiments of the present invention include a system that stores, in a memory, first service identification information for identifying a service to be used by a first communication terminal that requests for content data, second service identification information for identifying a service to be used by a second communication terminal that transmits content data, and content data information indicating property of content data that can be transmitted to the first communication terminal, in association with one another. After a session for transmitting content data is established between the first communication terminal and the second communication terminal, the system controls transmission of content data from the second communication terminal to the first communication terminal, so as to transmit content data having a property indicated by the content data information that is stored in association with the first service identification information and the second service identification information.

The above-described system may be implemented by a management system such as a sever, a terminal such as the second communication terminal.

Example embodiments of the present invention include a method of controlling transmission of control data, and a transmission control program stored on a non-transitory recording medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is an illustration of an example data structure of an authentication management table;

FIG. 7B is an illustration of an example data structure of a terminal management table;

FIG. 7C is an illustration of an example data structure of an application use management table;

FIG. 7D is an illustration of an example data structure of a session management table;

FIG. 8A is an illustration of an example data structure of a service list management table;

FIG. 8B is an illustration of an example data structure of a transmission management table;

FIG. 19 is a data sequence diagram illustrating operation of processing a request for obtaining content data, according to an embodiment of the present invention.

Figure 1:
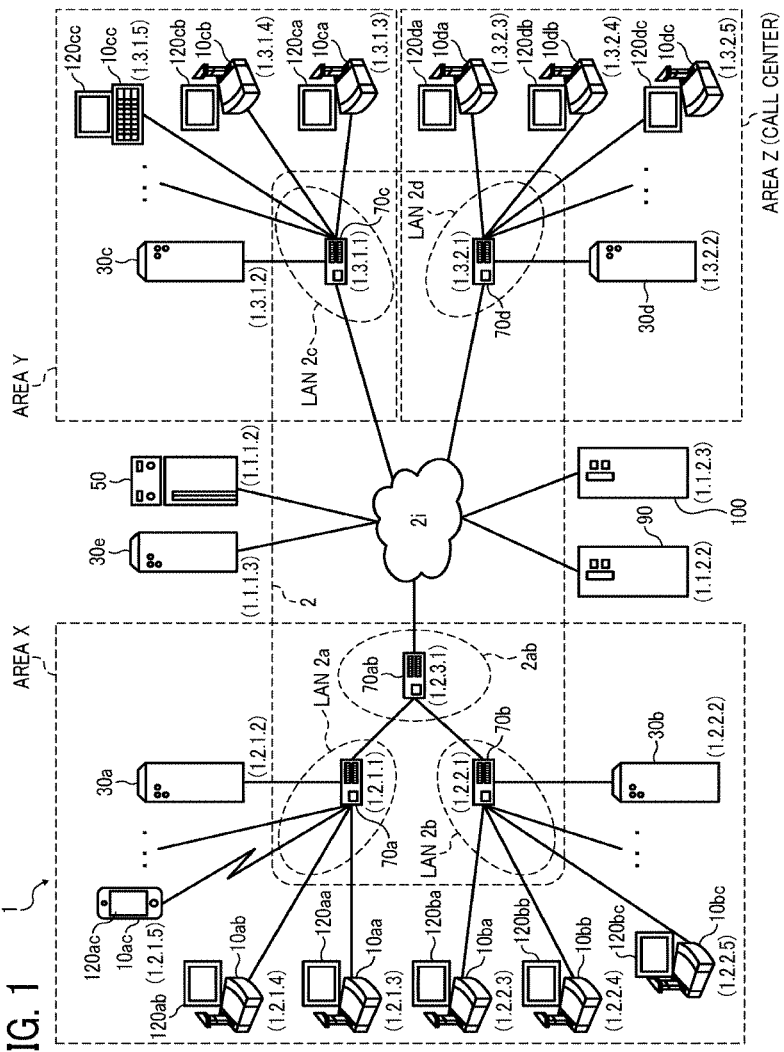
FIG. 1 is a schematic diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, an embodiment of the present invention is described. In the following, a "communication terminal" may simply be referred to as a "terminal", and a "communication management system" may simply be referred to as a "management system".

<Configuration of Communication System>

FIG. 1 is a schematic diagram illustrating a configuration of a communication system according to an example embodiment of the present invention. As illustrated in FIG. 1, the communication system 1 includes a plurality of terminals (10aa, 10ab, . . . ), a plurality of displays (120aa, 120ab, . . . ) for respective terminals (10aa, 10ab, . . . ), a plurality of relay devices (30a, 30b, 30c, 30d, 30e), a management system 50, a program providing system 90, and a maintenance system 100. The communication system 1 controls communication of content data, such as image data and sound data, to carry out videoconference among a plurality of remotely located sites. One or more of a plurality of routers (70a, 70b, 70c, 70d, 70ad) is selected to relay content data via an optical route.

The terminals (10aa, 10ab, 10ac, . . . ), the relay device 30a, and the router 70a are connected through a LAN 2a to be communicable with each other. The LAN 2a and the LAN 2b are connected through a dedicated line 2ab including the router 70ab to be communicable with each other. The LAN 2a, the LAN 2b, and the dedicated line 2ab are provided in an area X. Any one of these devices may be connected directly to the Internet 2i, without using the dedicated line.

The terminals (10ca, 10cb, 10cc, . . . ), the relay device 30c, and the router 70c are connected through the LAN 2c to be communicable with each other through the LAN 2c. The LAN 2c is provided in an area Y.

The terminals (10da, 10db, 10dc, . . . ), the relay device 30d, and the router 70d are connected through the LAN 2d to be communicable with each other. The LAN 2d is provided in an area Z. The areas X, Y, and Z may be located within one country, or over different countries.

The areas X, Y, and Z are connected through the routers (70ab, 70c, and 70d) to the Internet 2i to be communicable. In this example, the area Z is a location where a call center is provided. In this disclosure, any one of the terminals 10 (10da, 10db, 10dc, . . . ) located at the call center may be referred to as the call center terminal 10d. As described below, the terminal 10 connects with at least one terminal 10d (10da, 10db, 10dc, . . . ) at the call center to have reception services.

In the following, any arbitrary terminal of the plurality of terminals (10aa, 10ab, . . . ) is referred to as the terminal 10. Any arbitrary display of the plurality of displays (120aa, 120ab, . . . ) is referred to as the display 120. Any arbitrary relay device of the relay devices (30a, 30b, 30c, 30d, 30e) is referred to as the relay device 30. Any arbitrary router of the plurality of routers (70a, 70b, 70c, 70d, 70ab) is referred to as the router 70.

The management system 50, the program providing system 90, and the maintenance system 100 are connected to the Internet 2i. The management system 50, the program providing system 90, and the maintenance system 100 may be provided in any of the areas X, Y, and Z, or any area other than the areas X, Y, and Z.

In this example, the communication network 2 includes the LAN (2a, 2b, 2c, 2d), the dedicated line 2ab, and the Internet 2i. The communication network 2 may not only include a wired network, but also a wireless network such as a network in compliance with WiFi (Wireless Fidelity) or Bluetooth, or a mobile phone network.

In FIG. 1, four digits shown below each one of the terminals 10, the relay devices 30, the management system 50, the routers 70, the program providing system 90, and the maintenance system 100 indicate a simplified expression of IP address that is assigned to each device capable of functioning as a communication device. For simplicity, the IP address is expressed in Internet Protocol version 4 (IPv4), but the IP address may be expressed in IPv6 instead.

When application is executed, the terminals 10 transmit or receive content data such as image data and sound data, to carry out communication among the users. More specifically, the terminal 10 transmits or receives content data using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

<Hardware Configuration>

Figure 2:
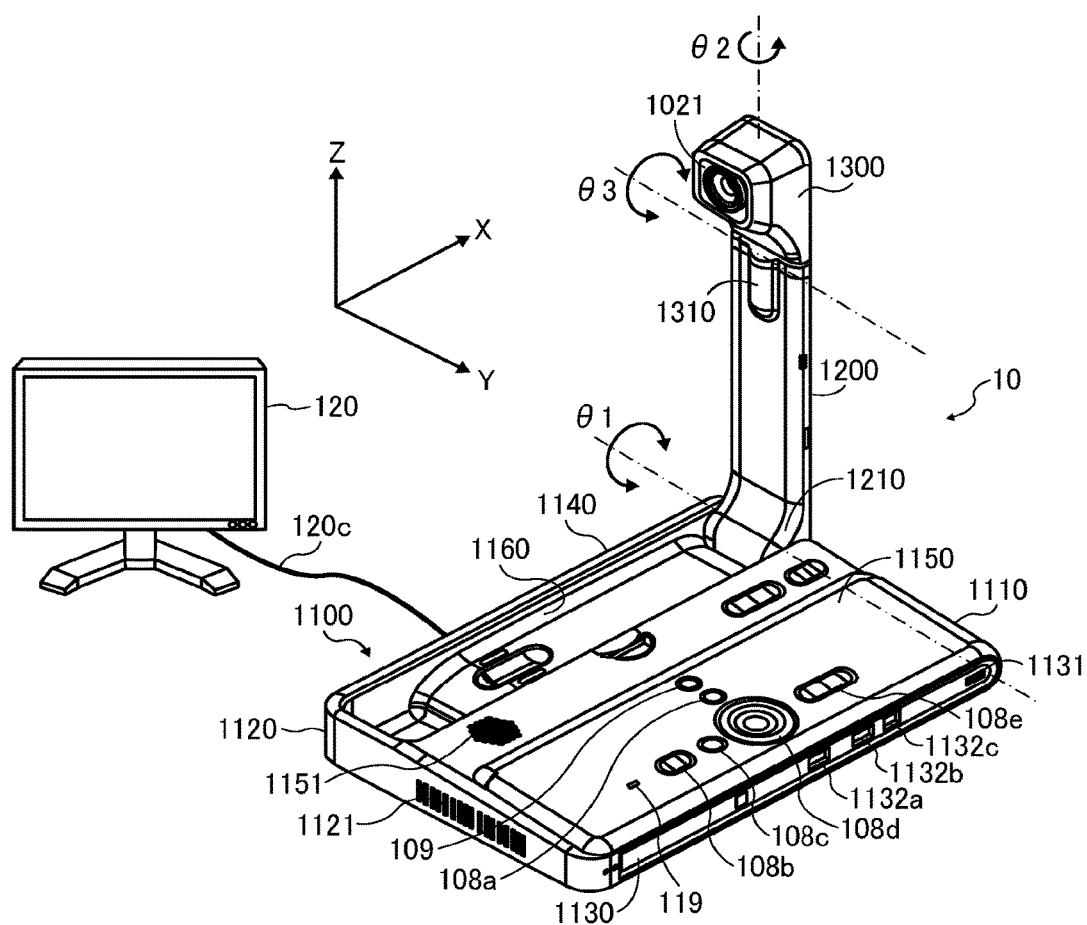
FIG. 2 is an external view illustrating a terminal of the communication system of FIG. 1.

Now, a hardware configuration of the communication system 1 is explained. FIG. 2 is an external view illustrating the terminal 10 according to an example embodiment of the present invention. The terminal 10 includes a casing 1100, an arm 120, and a camera housing 1300. The casing 1100 includes a front side wall 1100 having a plurality of air intake holes formed over the nearly entire surface of the intake surface, and a back side wall 1120 having a plurality of exhaust holes over the nearly entire surface of the exhaust surface 1121. When a cooling fan in the casing 1100 is driven, air flows in through the intake holes of the intake surface and out through the exhaust holes of the exhaust surface 1121. The casing 1100 further includes a right side wall 1130 formed with a sound pickup hole 1131. Through the sound pickup hole 1131, a microphone 114 of the terminal 10 is able to catch sounds such as human voice or any sound including noise.

The casing 1100 has an operation panel 1150, which is provided at a front surface toward the right side wall 1130. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an external device connection I/F 118. The casing 1100 further includes a left side wall 1140, which is provided with a connection port to connect the external display 120 to the display I/F 117 through a cable 120c.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210. With the torque hinge 1210, the arm 1200 can be rotated in directions of up and down with respect to the casing 1100, while making a tilt angle θ1 of up to 135 degrees. FIG. 2 illustrates the case where the tilt angle θ1 is 90 degrees.

The camera housing 1300 incorporates therein the camera 112 that takes an image of an object. The object may be a part of a user, document, or a room where the terminal 10 is located. The camera housing 1300 is provided with a torque hinge 1310. The camera housing 1300 is attached to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

Note that the external view illustrated in FIG. 2 is only exemplary and the appearance is not restricted thereto. The communication terminal 10 may be, for example, a general-purpose personal computer (PC), a portable phone, a projector, an electronic whiteboard, or a digital signage (See 10ac and 10cc in FIG. 1). When the terminal 10, for example, when implemented by a computer, is not provided with a microphone or a camera, any external microphone or external camera may be connected with the terminal 10. When the terminal 10 is implemented by the PC or the portable phone, the terminal 10 is connected to the Internet 2i through a wireless network such as a wireless LAN or mobile phone network. Further, when the terminal 10 is implemented by PC, such PC may be previously installed with application for enabling the PC to function as the videoconference terminal 10 of FIG. 2 as described below.

Since the communication management system 50, the program providing system 90, and the maintenance system 100 has the same appearance as that of a general server computer, a description of the appearance thereof is omitted.

Figure 3:
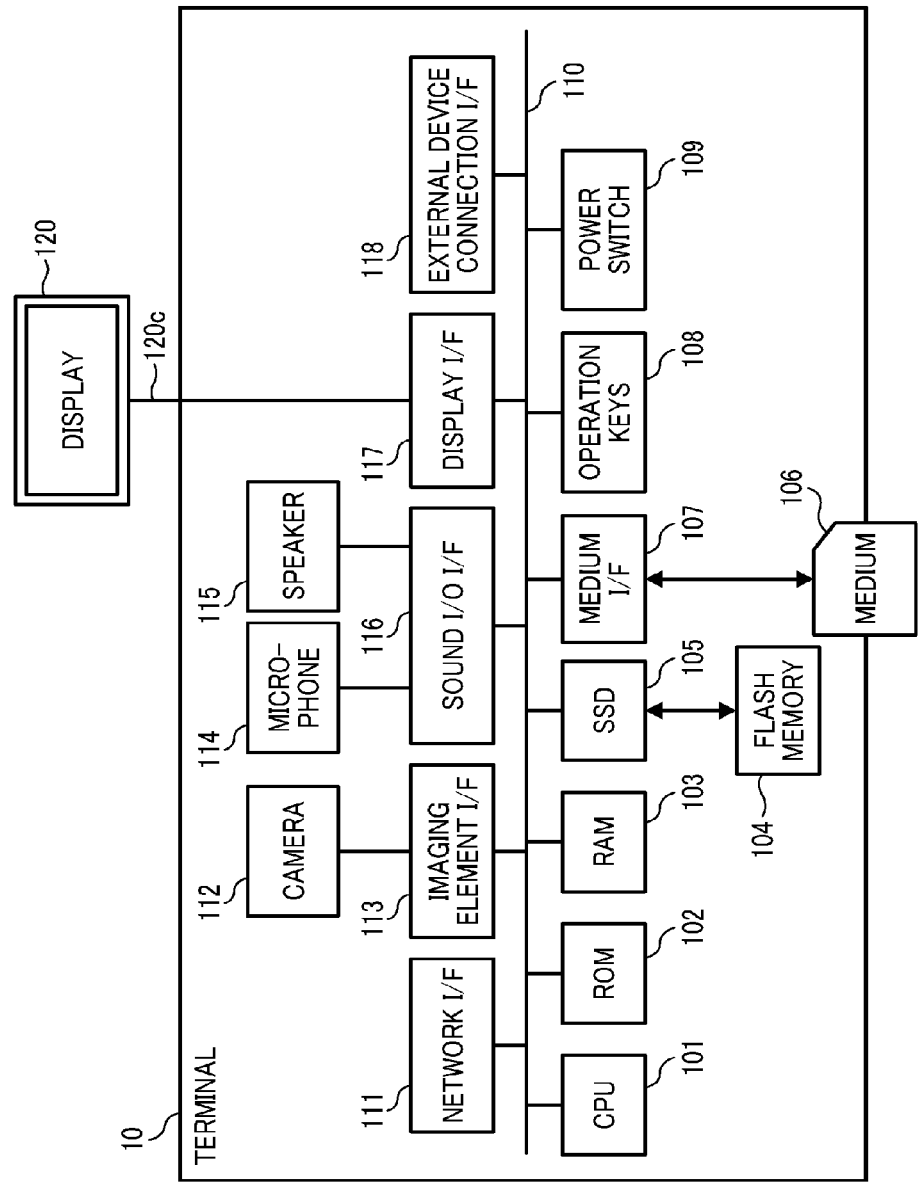
FIG. 3 is a schematic block diagram illustrating a hardware configuration of the terminal of FIG. 2.

FIG. 3 illustrates a hardware configuration of the terminal 10 according to the embodiment of the present invention. The terminal 10 includes a central processing unit (CPU) 101 that controls entire operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 (such as a medium drive) that controls reading/writing (storage) of data from/to a recording medium 106 such as a flash memory or an IC card, the operation keys 108 operated in the case of, for example, selecting a counterpart terminal of the terminal 10, the power switch 109 for turning on/off the power of the terminal 10, and a network interface (I/F) 111 for transmitting data using the communication network 2.

The terminal 10 further includes the built-in camera 112 that captures an image of a subject and obtains image data under control of the CPU 101, an imaging element I/F 113 that controls driving of the camera 112, the built-in microphone 114 that receives a sound input, the built-in speaker 115 that outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable that is inserted into the connection port 1132 or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the terminal 10. The recording medium 106 can be any non-volatile memory that reads or writes data under control of the CPU 101, such that any memory such as an electrically erasable and programmable read-only memory (EEPROM) may be used instead of the flash memory 104.

Figure 4:
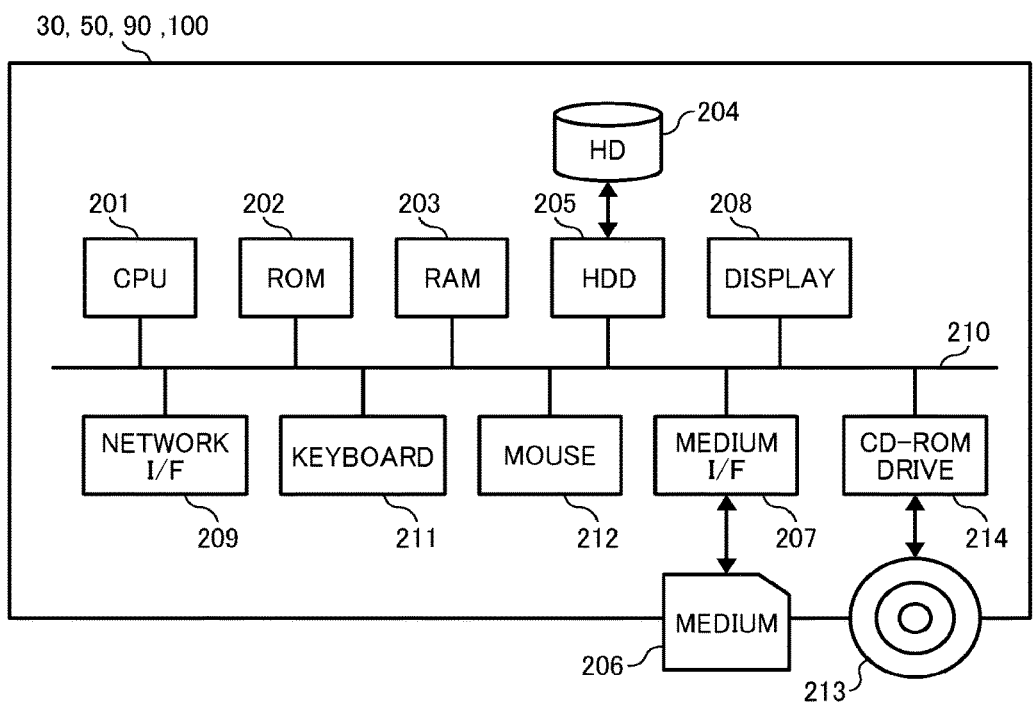
FIG. 4 is a schematic block diagram illustrating a hardware configuration of a management system, relay device, program providing system, or maintenance system of the communication system of FIG. 1.

FIG. 4 illustrates a hardware configuration of the management system 50 according to the embodiment. The management system 50 includes a CPU 201 that controls entire operation of the management system 50, a ROM 202 that stores a program used for driving the CPU 201 such as an IPL, a RAM 203 used as a work area for the CPU 201, the HD 204 that stores various types of data such as the transmission management program, a hard disk drive (HDD) 205 that controls reading/writing of various types of data from/to the HD 204 under control of the CPU 201, a medium I/F 207 (such as a medium drive) that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Since the relay devices 30, the program providing system 90, and the maintenance system 100 each have a hardware configuration that is the same as or similar to that of the above-described management system 50, a description thereof is omitted.

Figure 5:
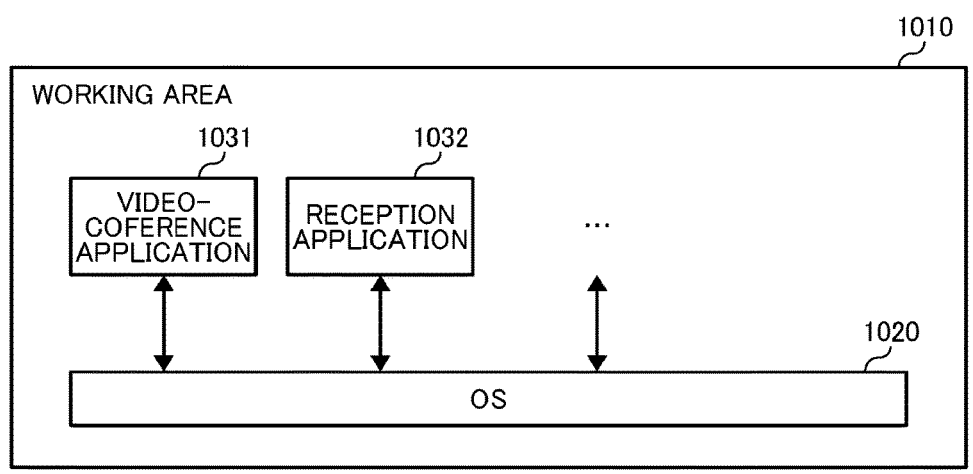
FIG. 5 is a schematic block diagram illustrating a software configuration of the terminal of FIG. 1.

FIG. 5 illustrates a software configuration of the terminal 10 according to the embodiment of the present invention. As illustrated in FIG. 5, the terminal 10 is installed with an OS 1020, videoconference application 1031, and reception application 1032, each of which operates on a work area 1010 of the RAM 103.

The OS 1020 is basic software that controls entire operation of the terminal 10 through providing basic functions. The videoconference application 1031 enables the terminal 10 to communicate with the other terminal 10 to carry out videoconference. The reception application 1032 enables the terminal 10 to communicate with the terminal 10d at the call center to have conversation (communication) with the operator at the call center.

In alternative to the above-described application, any other application may be installed on the terminal 10. For example, the program providing system 90 may store any desired application in its memory, and upon request from the terminal 10, transfer such application to be downloaded onto the terminal 10. Further, a plurality of types of videoconference application 1031 may be installed, such as application that differs in communications protocol.

<Functional Configuration of Communication System>

Figure 6:
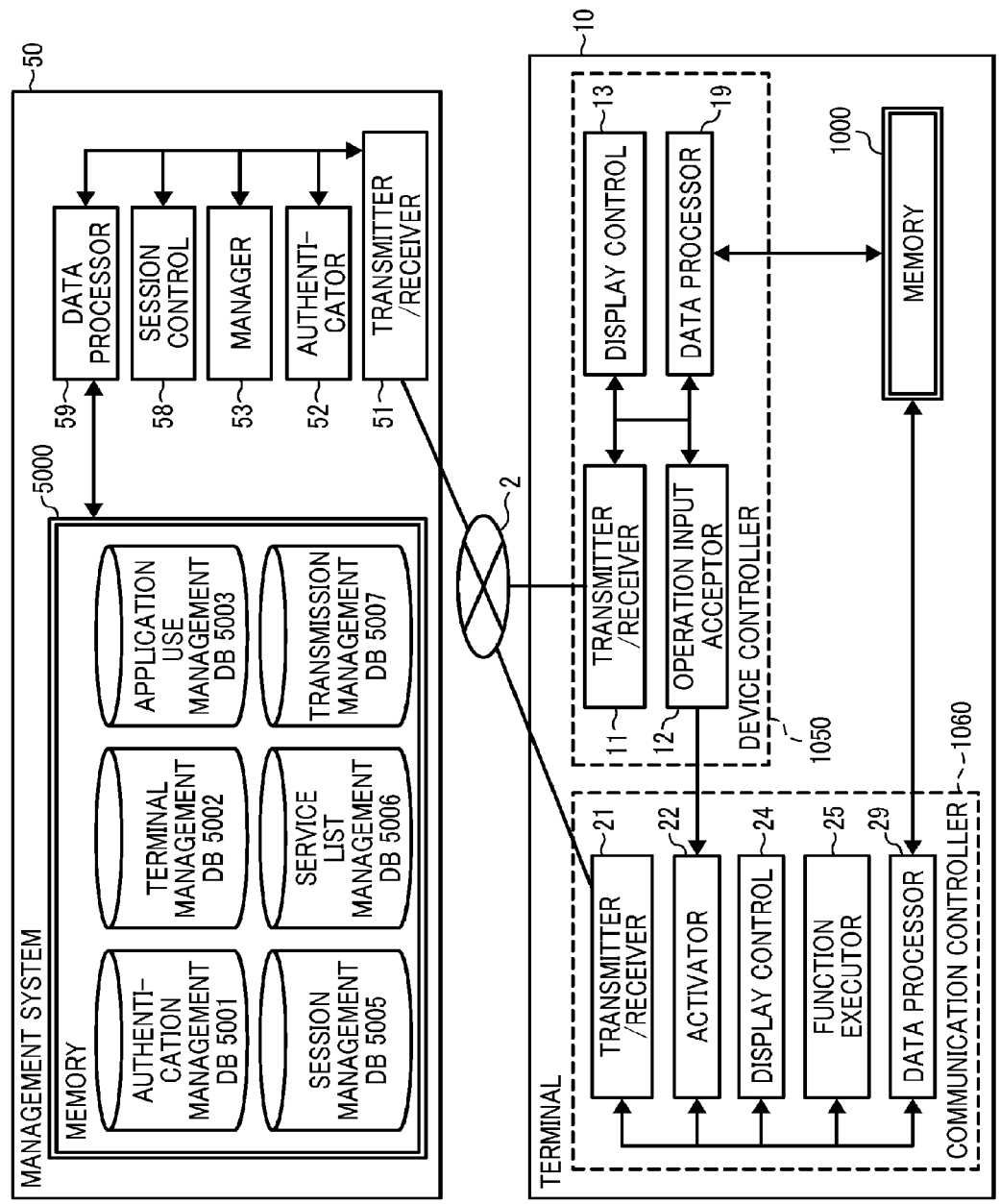
FIG. 6 is a schematic block diagram illustrating a functional configuration of the terminal and the management system of the communication system of FIG. 1.

Now, functional configuration of the communication system 1 is explained. FIG. 6 is a schematic block diagram illustrating a functional configuration of the terminal 10 and the management system 50 in the communication system 1. In FIG. 6, the terminal 10 and the management system 50 are connected through the Internet 2 to transmit or receive data.

<Functional Configuration of Terminal>

The terminal 10 includes a device controller 1050 and a communication controller 1060. The device controller 1050 is implemented with execution of the OS 1020. The communication controller 1060 is implemented with execution of, for example, the videoconference application 1031 or the reception application 1032.

The device controller 1050 includes a transmitter/receiver 11, an operation input acceptor 12, a display control 13, and a data processor 19. These elements in FIG. 6 correspond to a plurality of functions, which are executed according to the instructions of the CPU 101 (FIG. 3) that are generated according to application (such as the executed application) being loaded from the flash memory 104 onto the RAM 103.

The communication controller 1060 includes a transmitter/receiver 21, an activator 22, a display control 24, a function executor 25, and a data processor 29. These elements shown in FIG. 6 correspond to a plurality of functions, which are performed by the elements shown in FIG. 3 according to the instructions of the CPU 101 (FIG. 3) that are generated according to the videoconference application 1031 or the reception application 1032 being loaded from the flash memory 104 onto the RAM 103.

The terminal 10 further includes a memory 1000, which is implemented by the ROM 102, RAM 103, or flash memory 104 of FIG. 3.

(Functional Configuration of Device Controller)

Now, functional configuration of the device controller 1050 of the terminal 10 is explained according to an example embodiment of the present invention. In the following description of functional configuration of the device controller 1050 of the terminal 10, relationships with hardware elements for implementing the functional configuration of the device controller 1050 shown in FIG. 3 is also described.

The transmitter/receiver 11, which is implemented by instructions of the CPU 101 and the network I/F 111, transmits or receives various data (or information) to or from the counterpart terminal, device, or system, through the communication network 2.

The operation input acceptor 12, which may be implemented by instructions of the CPU 101, the operation keys (108a, 108b, 108c, 108d, 108e), and the power switch 109, receives various inputs or selections from the user.

The display control 13, which may be implemented by the instructions of the CPU 101 and the display I/F 117, controls display of an image through the display 120.

The data processor 19, which may be implemented by the instructions of the CPU 101 and the SSD 105, or the instructions of the CPU 101, stores various data in the memory 1000 or reads various data from the memory 1000.

(Functional Configuration of Communication Controller)

Next, functional configuration of the communication controller 1060 of the terminal 10 is explained according to the embodiment of the present invention. In the following description of functional configuration of the communication controller 1060 of the terminal 10, relationships of the hardware elements in FIG. 3 with the functional configuration of the communication controller 1060 in FIG. 6 is also described.

The transmitter/receiver 21, which may be implemented by the instructions of the CPU 101 and the network I/F 111, transmits or receives various data (or information) to or from the counterpart terminal, device, or system, through the communication network 2.

The activator 22, which may be implemented by instructions of the CPU 101, activates the communication controller 1060, in response to an activation request at the operation input acceptor 12, when the operation input acceptor 12 receives a user selection of application. More specifically, when the user selects activation of the videoconference application 1031, the communication controller 1060 is activated under control of the videoconference application 1031. When the user selects activation of the reception application 1032, the communication controller 1060 is activated under control of the reception application 1032.

The display control 24, which may be implemented by the instructions of the CPU 101 and the display I/F 117, controls transmission of image data to the display 120. Further, the display control 24 controls a user interface for display to the user, according to the selected application such as the videoconference application 1031 or the reception application 1032. The display control 24 is able to control display of information in a manner that matches the user's current needs according to the selected application.

The functional executor 25, which may be implemented by the instructions of the CPU 101, and at least one of the camera 112, microphone 114, and speaker 115, controls communication of image data or sound data.

The data processor 29, which may be implemented by the instructions of the CPU 101 and the SSD 105, or the instructions of the CPU 101, stores various data in the memory 1000 or reads various data from the memory 1000.

<Functional Configuration of Management System>

Referring to FIG. 6, the management system 50 includes a transmitter/receiver 51, an authenticator 52, a manager 53, a session control 58, and a data processor 59. These elements correspond to a plurality of functions of hardware elements in FIG. 4, which operate according to the instructions of the CPU 101 (FIG. 4) that are generated according to the communication management program read from the RAM 203 onto the HD 204. The management system 50 further includes a memory 5000, which may be implemented by the HD 204. The memory 5000 stores, for each application being managed by the management system 50, application ID and application icon data. The memory 5000 further stores a plurality of databases (DBs) as described below.

(Authentication Management Table)

FIG. 7A is an illustration of an example data structure of an authentication management table. The memory 5000 stores an authentication management DB 5001, which may be implemented by the authentication management table of FIG. 7A. The authentication management table of FIG. 7A stores, for each one of a plurality of terminals 10 that are managed by the management system 50, a contact ID, a password to be used for authentication, and a service ID for identifying the service that can be used by the terminal 10. The contact ID is any information for identifying a communication destination in the communication system 1. Examples of contact ID include, but not limited to, terminal identification information for identifying the terminal 10 such as the terminal ID, and identification information for identifying a user of the terminal 10 such as a user account. In the following, it is assumed that the terminal identification information is used as the contact ID of the terminal 10. Further, in the following, it is assumed that the terminal 10aa is assigned with the contact ID "01aa", and the terminal 10db is assigned with the contact ID "01db".

(Terminal Management Table)

FIG. 7B is an illustration of an example data structure of a terminal management table. The memory 5000 stores a terminal management DB 5002, which may be implemented by the terminal management table of FIG. 7B. The terminal management table of FIG. 7B stores, for each one of the plurality of terminals 10 managed by the management system 50, the contact ID of the terminal 10, the counterpart name (terminal name) of the terminal 10 when serving as a communication destination of the other terminal, the operating state of the terminal 10, an IP address assigned to the terminal 10, and the service ID for identifying the service being used by the terminal 10, in association with one another. Referring to FIG. 7B, the operating state "offline" indicates that the terminal 10 is not logging in to the management system 50. The operating state "online (communication OK)" indicates that the terminal 10 is logging in to the management system 50, and is not communicating with the other terminal 10. The operating state "online (communicating)" indicates that the terminal 10 is logging in to the management system 50, and is communicating with the other terminal 10.

(Application Use Permission Management Table)

FIG. 7C is an example data structure of an application use permission management table (application use management table). The memory 5000 stores an application use management DB 5003, which may be implemented by the application use management table of FIG. 7C. The application use management table stores, for the contact ID that identifies each one of the terminals 10 managed by the management system 50, an application ID that identifies each one of a plurality of applications installed on the terminal 10, and use permission information indicating whether use of the application is allowed ("ON") or not allowed ("OFF") by the terminal 10. For example, the application use management table of FIG. 7C indicates that, for each one of the terminals 10aa and 10db, four applications respectively having the application IDs "a001", "a002", "a003", and "a004" are installed. For each one of the terminal 10aa and the terminal 10db, applications with the application IDs "a001" and "a002" are allowed, but applications with the application IDs "a003" and "a003" are not allowed.

(Session Management Table)

FIG. 7D is an example data structure of a session management table. The memory 5000 also stores a session management DB 5005, which may be implemented by a session management table of FIG. 7D. The session management table stores, for each one of a plurality of content data sessions being managed by the management system 50, the session ID for identifying the session, a relay device ID for identifying the relay device that relays content data between the terminals 10, and a contact ID for identifying each terminal 10 participating in that session.

(Service Management Table)

FIG. 8A is an illustration of an example data structure of a service list management table. The memory 5000 further stores a service list management DB 5006, which may be implemented by the service list management table illustrated in FIG. 8A. The service list management table stores, for each one of a plurality of services that can be provided or managed by the management system 50, the service ID for identifying the service, the service type (or service name) of the service, and a function to be performed by the terminal 10 when using that service, in association with one another. The service type, in this example, may correspond to the application for providing such service, for example, videoconference (meeting) service to be provided with the videoconference application, reception service to be provided with the reception application, remote monitoring service to be provided with remote monitoring application, etc. The service name, which may be application name, may be used as the service type. Further, the function to be performed by the terminal 10 may correspond to a function that can be provided by such application, which may be customized for each user. The user, in this embodiment, may be an individual user or a group of users such as an organization.

(Transmission Management Table)

FIG. 8B is an illustration of an example data structure of a transmission management table. The memory 5000 stores a transmission management DB 5007, which may be implemented by the transmission management table of FIG. 8B. The transmission management table stores a service ID ("request sender service ID") for identifying the service being used by the terminal 10 ("request sender terminal") that sends a request for content data, a service ID ("data sender service ID") for identifying the service being used by the terminal 10 ("data sender terminal") that sends content data to the request sender terminal 10, and content information ("content") indicating a type of content data that is allowed for transmission from the data sender terminal (transmission source) to the request sender terminal (transmission destination). The content information may include various parameters of content data such as a resolution of image data, a frame rate, or bit rate, in addition or in alternative to a type of content data.

(Functional Configuration of Management System)

Next, referring back to FIG. 6, functional configuration of the management system 50 will be described in detail. In the following description of functional configuration of the management system 50, relationships of the elements in FIG. 4 with functional configuration of the management system 50 in FIG. 6 is also described.

The transmitter/receiver 51, which may be implemented by the instructions of the CPU 201 and the network I/F 209, transmits or receives various data (or information) to or from each terminal, device, or system through the communication network 2.

The authenticator 52, which may be implemented by the instructions of the CPU 201, searches the authentication management table (FIG. 7A) using a contact ID and a password received at the transmitter/receiver 51 as a search key, to authenticate the terminal 10 based on determination of whether the same contact ID and password are managed in the authentication management table.

The manager 53, which may be implemented by the instructions of the CPU 201, updates the operating state, etc., in the terminal management table of FIG. 7B to keep updated such as the operating state in the terminal management table of FIG. 7B. The manager 53 determines whether to provide a service, which is requested by the terminal 10 that sends a service use request.

The session control 58, which may be implemented by the instructions of the CPU 201, controls a session through which content data is transmitted between the terminals 10. Examples of control include, but not limited to, control to establish a session, control to enable the terminal 10 to participate in the established session, and control to end the session.

The data processor 59, which may be implemented by the instructions of the CPU 201 and the HDD 205, or the instructions of the CPU 201, stores various data in the memory 5000 or reads various data from the memory 5000.

<Operation of Communication System>

Now, operation performed by the communication system 1 is explained according to an example embodiment of the present invention.

Figure 9:
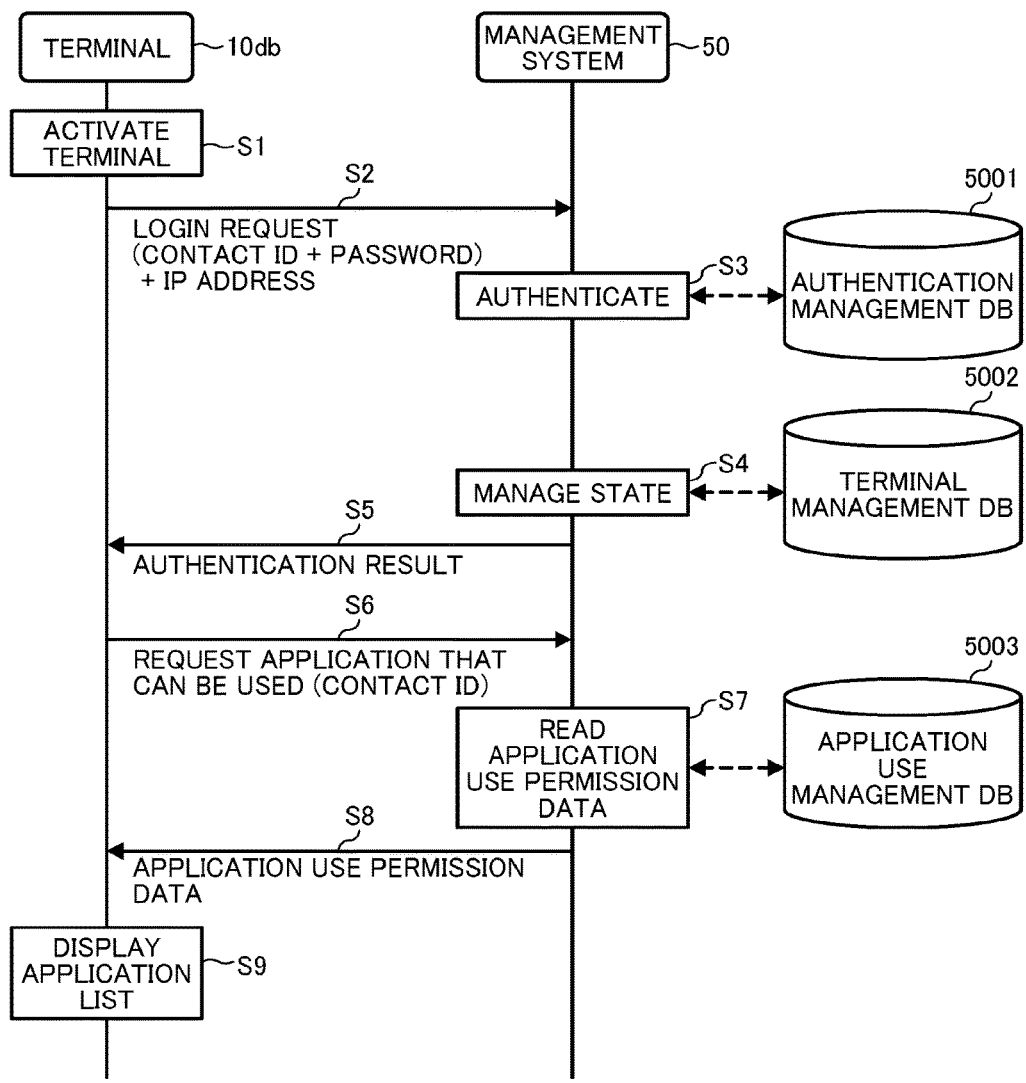
FIG. 9 is a data sequence diagram illustrating operation of activating the terminal, according to an embodiment of the present invention.

Referring to FIG. 9, operation from the time when the terminal 10*db* is activated, to the time when the terminal 10*db* displays an application list, is explained. FIG. 9 is a data sequence diagram illustrating operation performed by the communication system 1, from the time when the terminal 10*db* is activated to the time when the terminal 10*db* displays an application list.

In response to turning on of the power switch 109 by the user, at S1, the operation input acceptor 12 accepts the instruction for turning on, and the terminal 10*db* is turned on to be activated. In response to receiving turning on operation, at S2, the transmitter/receiver 11 sends a login request to the management system 50 through the communication network 2. The management system 50 receives the login request at the transmitter/receiver 51. The login request includes a contact ID for identifying the terminal 10*db* that sends the login request, and a password. These contact ID and password are read from the memory 1000 by the data processor 29, and transmitted to the transmitter/receiver 11. Alternatively, the contact ID and password may be input by the user through the operation key 108. Alternatively, the contact ID and password may be read out from the recording medium 106. As the terminal 10*db* sends the login request to the management system 50, the management system 50, which is the receiver side, obtains the IP address of the terminal 10*db* that is the sender side, which may be transmitted with the login request.

At S3, the authenticator 52 of the management system 50 searches the authentication management table of FIG. 7A using the contact ID and password included in the login request as a search key to authenticate the terminal 10*db* based on determination of whether the same contact ID and password are managed in the authentication management table (FIG. 7A). When the authenticator 52 determines that the terminal 10 that sends the login request is an authenticated terminal, at S4, the manager 53 stores, in the terminal management table of FIG. 7B, the contact ID "01 db" of the terminal 10*db*, the operating state ("Online, communication OK"), and the IP address of the terminal 10*db* in association with one another.

At S5, the transmitter/receiver 51 of the management system 50 transmits authentication result information indicating an authentication result, obtained by the authenticator 52, to the terminal 10*db* that sends the login request through the communication network 2. The terminal 10*db* receives the authentication result at the transmitter/receiver 11.

When the authenticator 52 determines that the terminal 10 that sends the login request is an authenticated terminal, the data transmitter/receiver 11 of the terminal 10*db* sends a request for application use permission data to the management system 50 via the communication network. The application use permission data indicates one or more applications that can be used by the terminal 10*db*. The application use permission data request includes the contact ID of the terminal 10*db*, which sends the request. The management system 50 receives the application use permission data request.

At S7, the data processor 59 of the management system 50 searches the application use management table (FIG. 7C) using the contact ID of the terminal 10*db* that requests for application use permission data as a search key to obtain the application use permission data for the terminal 10*db*.

At S8, the transmitter/receiver 11 transmits application use permission data, which is read at S7, to the terminal 10*db* through the communication network 2. The transmitter/receiver 11 of the terminal 10*db* receives the application use permission data at the transmitter/receiver 11.

Figure 10:
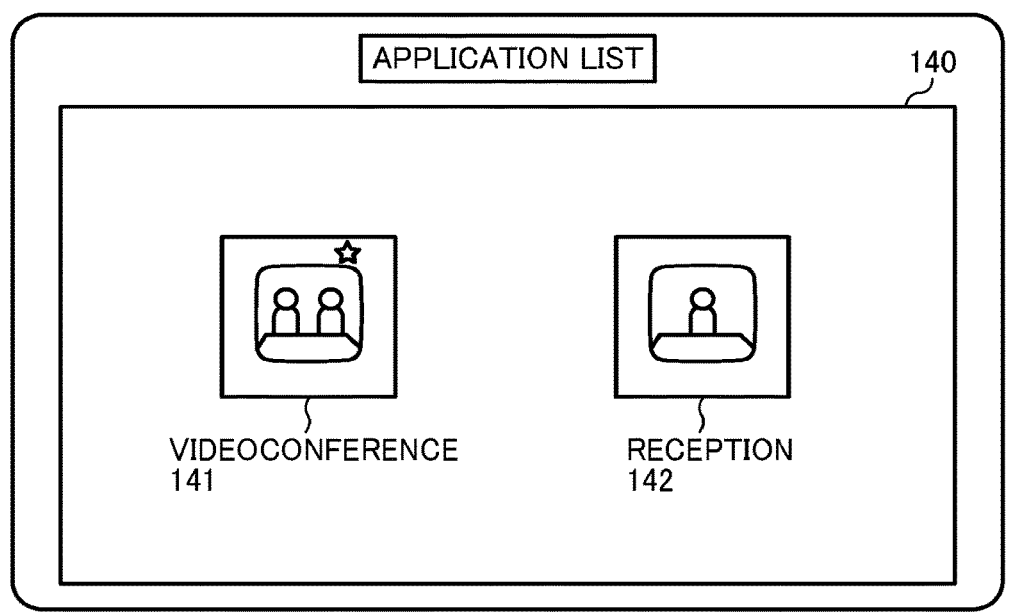
FIG. 10 illustrates an example application list screen.

At S9, the display control 13 causes the display 120*db* to display an application list screen 140, such as that illustrated in FIG. 10. FIG. 10 illustrates an example application list screen. The screen 140 includes, for the respective applications having the application IDs (a001, a002) that are permitted to be used by the terminal 10*db*, application icons (141, 142) corresponding to the applications that can be used.

Figure 11:
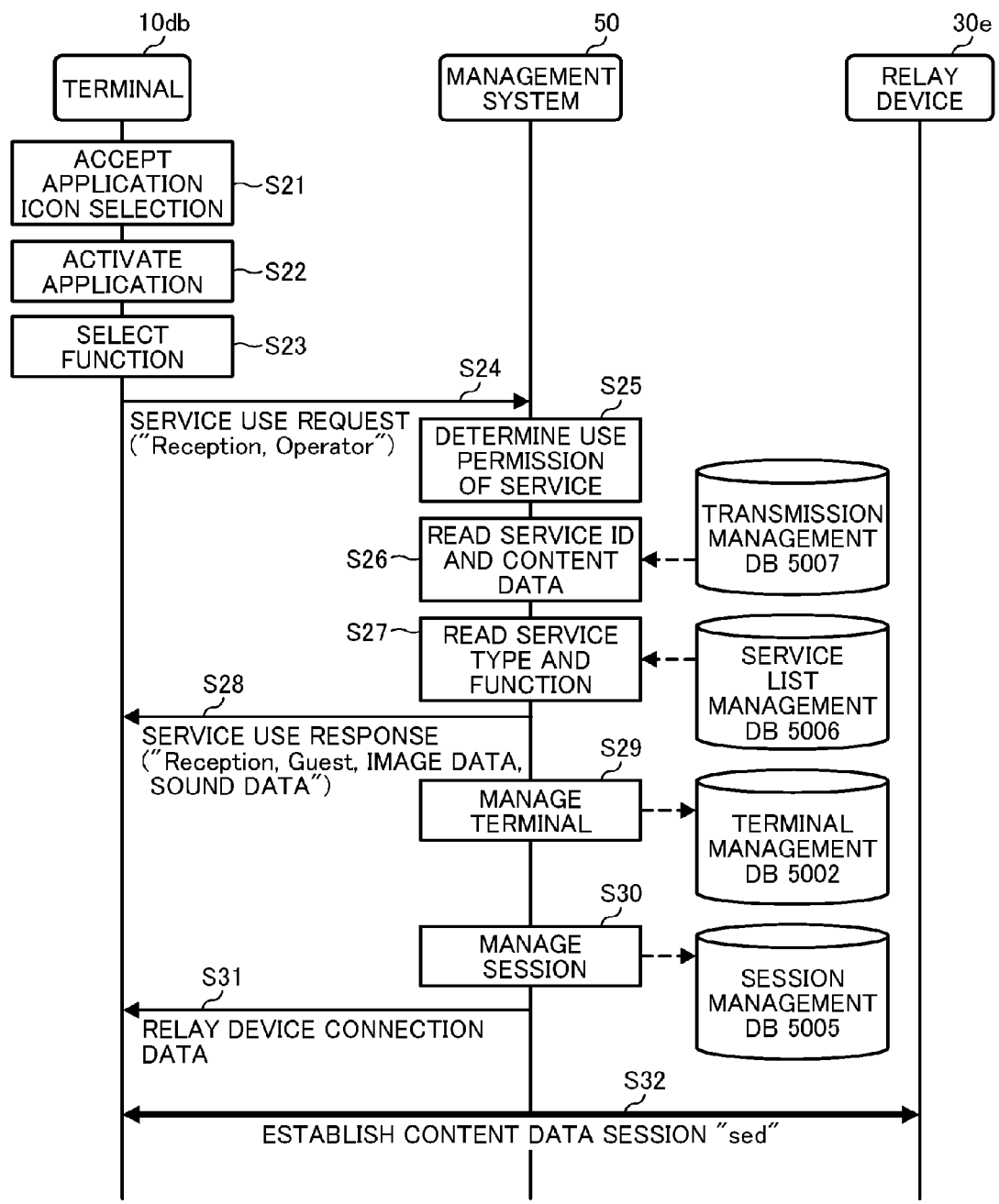
FIG. 11 is a data sequence diagram illustrating operation of processing a request for using a service, according to an embodiment of the present invention.

Referring to FIG. 11, operation of processing a request for using a service, which is transmitted from a user at the terminal 10*db*, is described according to an embodiment of the present invention. In this embodiment, it is assumed that the application icon 142 is selected by the user at the terminal 10*db*. FIG. 11 is a data sequence diagram illustrating operation of processing a request for using a service from the terminal 10*db*.

In response to a selection of the application icon 142 corresponding to the reception application 1032, from among a plurality of application icons on the screen of FIG. 10, at S21, the operation input acceptor 12 of the terminal 10*db* accepts a selection of application icon by the user. In this example, the user may select the application icon 142 using any one of the operation keys (108*a* to 108*e*).

The operation input acceptor 12 of the device controller 1050 instructs the activator 22, which operates under control of the reception application 1032, to activate the communication controller 1060 according to the reception application 1032. While the above-described steps up to S22 is performed by the device controller 1050, the following steps after S22 is performed by the communication controller 1060 that is activated under control of the reception application 1032.

At S23, the display control 24 of the communication controller 1060 instructs the display 120*db* to display a screen with available functions of the terminal 10 when the terminal 10 operates according to the reception application 1032. In this embodiment, the screen displays the functions "operator" and "guest" as functions of the reception application. The operation input acceptor 12 receives a user input that selects a specific function. In this example, it is assumed that the reception application 1032 is activated; however, any other application may be selected for activation. For example, when the videoconference application 1032 is activated, the display 120*db* displays a screen with available functions "presenter", "audience", and "participant" of the videoconference application. In another example, when the remote monitoring application is activated, the display 120*db* displays a screen with available functions "camera" and "monitor" of the monitoring application.

In the following, it is assumed that the operation input acceptor 12 of the terminal 10*db* receives a user input that selects the "operator". At S24, the transmitter/receiver 21 of the terminal 10*db* transmits a request for using the reception service with the operator function ("service use request") to the management system 50. In this example, the service use request includes the service type "reception", and the function "operator" that is selected at S23. Further, in this example, the reception application 1032 that is activated causes the transmitter/receiver 21 to automatically include the service type "reception" in the service use request.

In this example, the service use request may not include the contact ID of the terminal 10*db*. Since the terminal 10*db* has already logged in, the management system 50, which receives the service use request at the transmitter/receiver 51, is able to identify the terminal 10*db* that sends the service use request without the contact ID. In case the service use request includes the contact ID of the terminal 10*db* that sends the service use request, the management system 50 may identify the terminal 10*db* using the contact ID.

At S25, the manager 53 determines whether the service, which is requested for use by the terminal 10*db*, is allowed for use by the terminal 10*db*. More specifically, the data processor 59 searches the service list management table (FIG. 8A) using the service type "reception" and the function "operator" as a search key to obtain the service ID "1004" for identifying the "reception" service with the "operator" function. The data processor 59 searches the authentication management table (FIG. 7A) using the contact ID "01*db*" of the terminal 10*db* that sends the service use request as a search key to obtain the service ID "1004" of the service that the terminal 10*db* with the contact ID "01*db*" can use. When the service ID read from the service list management table (FIG. 8A) matches any one of the service IDs read from the authentication management table (FIG. 7A), the manager 53 determines that the terminal 10*db* is allowed to use the requested service. In contrast, when the service ID read from the service list management table (FIG. 8A) does not match any one of the service IDs read from the authentication management table (FIG. 7A), the manager 53 determines that the terminal 10*db* is not allowed to use the requested service.

The following describes the case in which the manager 53 determines that the terminal 10*db* can use the requested service. In such case, the manager 53 further obtains detailed information regarding the service requested by the terminal 10*db*, such as information regarding content data that can be used for that service. More specifically, at S26, the data processor 59 searches the transmission management table (FIG. 8B) using the service ID "1004", read from the service list management table (FIG. 8A), as a search key to specify the "request sender service ID" field having that service ID "1004", and further obtain the data sender service ID "1005" and content "image data" and "sound data" associated with that field. At S27, the data processor 59 searches the service list management table (FIG. 8A) using the data sender service ID "1005" read at S26 as a search key to obtain the service type "reception" and the function "guest".

At S28, the transmitter/receiver 51 of the management system 50 transmits a service use response indicating that the request for using the service is approved to the terminal 10*db*. The service use response includes information regarding the requested service. For example, the service use response includes the service type "reception" and the function "guest" read at S27, and the content "image data" and "sound data" read at S26. With this information, the terminal 10*db* is able to know that the terminal 10 using the reception service as a guest is allowed to transmit image data and sound data to the terminal 10db using the reception service as an operator. In case the management system 50 has a web server function, the transmitter/receiver 51 transmits the HTTP status code "200" indicating approval to use the service, and transmits the HTTP status code "403" or "406" indicating rejection to use the service. The terminal 10db may store the received information regarding the service of the counterpart terminal and content data, in its memory.

At S29, the manager 59 refers to the terminal management table (FIG. 7B) to change the operating state associated with the contact ID "01 db" of the terminal 10db, to "Online (communicating)". Further, at S29, the manager 53 refers to the terminal management table (FIG. 7B) to change the service ID associated with the contact ID "01db" of the terminal 10db, to the service ID read from the service list management table at S25. Accordingly, the service ID is changed to "1004" indicating the service that is requested by the terminal 10db.

At S30, the session control 58 generates a session ID for identifying a content data session "sed" that the terminal 10db will be participating. Further, at S30, the session control 58 selects a relay device 30, which is to relay content data in the content data session "sed". In the following, it is assumed that the session ID "sel" is generated, and the relay device 30e is selected. The data processor 59 stores the generated session ID "sel" and the relay device ID "111e" of the selected relay device 30e, in the session management table (FIG. 7D), in association with the contact ID "01db" of the terminal 10db that will participate in that session.

At S31, the transmitter/receiver 51 transmits relay device connection data, which is to be used for connecting the selected relay device 30e, to the terminal 10db. The relay device connection data may include, for example, the IP address of the relay device 30e, authentication information to be used for authentication, a port number, and the session ID generated at S30.

The terminal 10db, which requests for service, connects with the relay device 30e using the relay device connection data transmitted from the management system 50. At S32, the terminal 10db establishes a content data session "sed" with the relay device 30e. Through the session, the terminal 10db is able to transmit to the relay device 30e various content data (image data and sound data) generated at the terminal 10db. In this example, transmission of content data from the terminal 10db to the relay device 30e may be started at any time, for example, in response to establishing the content data session, or in response to a request from the relay device 30e or the management system 50.

Figure 12:
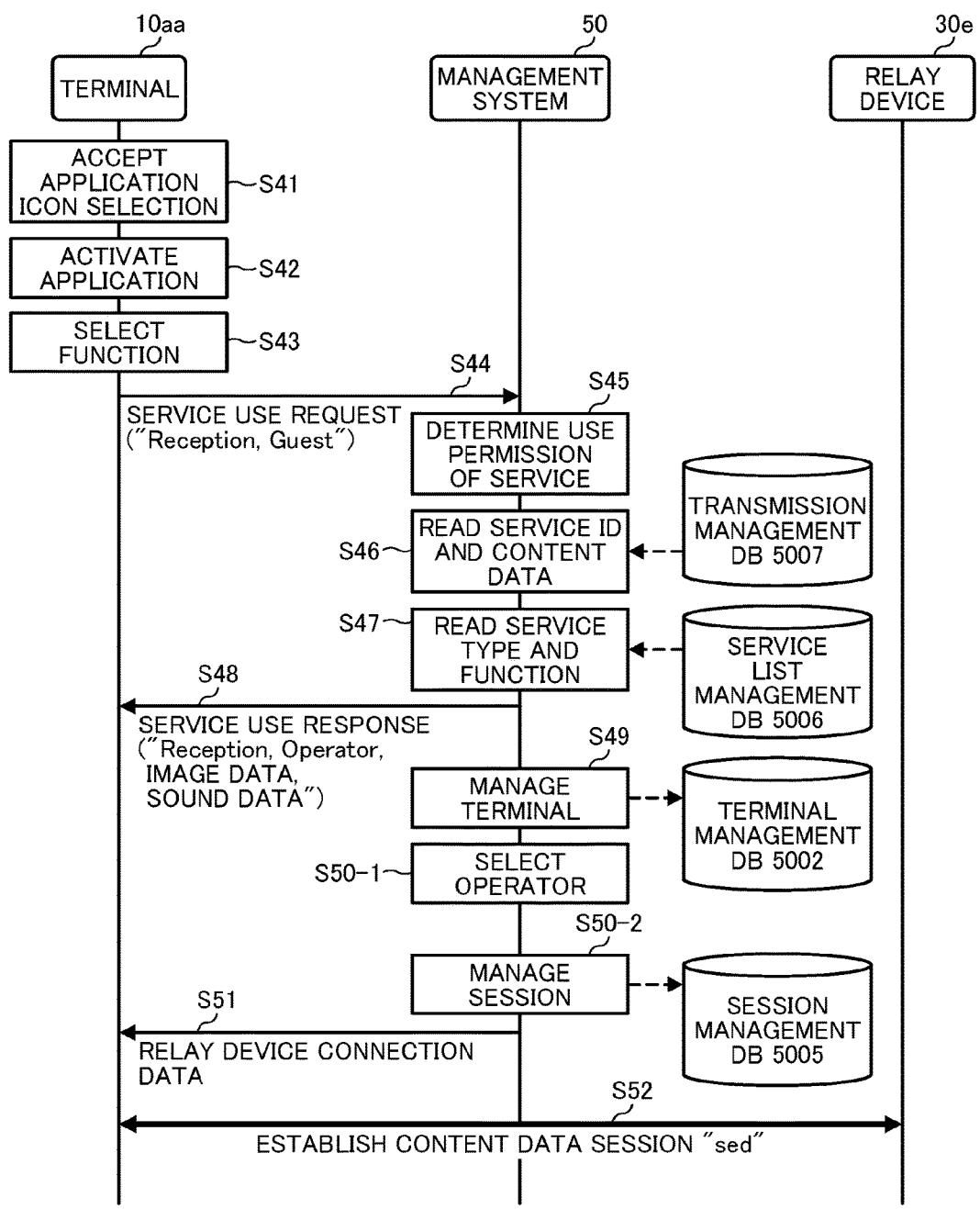
FIG. 12 is a data sequence diagram illustrating operation of processing a request for using a service, according to an embodiment of the present invention.

Referring to FIG. 12, operation of processing a request for using a service, which is transmitted from a user at the terminal 10aa, is described according to an embodiment of the present invention. FIG. 12 is a data sequence diagram illustrating operation of processing a request for using a service from the terminal 10aa. It is assumed that the terminal 10aa and the management system 50 perform S1 to S9 of FIG. 9 such that the display 120aa displays an application list screen such as that illustrated in FIG. 10.

In the following, it is assumed that the terminal 10aa receives a user selection of the reception application 1032, to perform S41 to S43 in a substantially similar manner as described above referring to S21 to S23 of FIG. 11. The terminal 10aa further receives a user selection of the function "guest" at S43. At S44, the transmitter/receiver 21 of the terminal 10aa transmits a service use request to the management system 50, which requests for approval to use the reception service with the guest function. The service use request includes the service type "reception", and the function "guest" that is selected at S43. As described above referring to FIG. 11, the contact ID may not be included or may be included, as long as the terminal 10aa can be identified.

S45 to S47 are performed in a substantially similar manner as described above referring to S25 to S28 of FIG. 11. At S48, the transmitter/receiver 51 of the management system 51 transmits a service use response to the terminal 10aa that sends the service use request. The service use response, in this example, includes the service type "reception" and the function "operator" read at S47, and content "image data/resolution 640×360, frame rate 30, bit rate Kbps" and "sound data" read at S46. With this information, the terminal 10aa is able to know the terminal 10 using the reception service as an operator can transmit image data with the indicated property and sound data to the terminal 10aa using the reception service as a guest. The terminal 10aa may store the received information regarding the service of the counterpart terminal and content data in its memory.

At S49, the manager 53 refers to the terminal management table (FIG. 7B) to change the operating state associated with the contact ID "01aa" of the terminal 10aa, to "Online (communicating)". Further, at S49, the manager 53 refers to the terminal management table (FIG. 7B) to change the service ID associated with the contact ID "01aa" of the terminal 10aa, to the service ID read from the service list management table at S47. Accordingly, the service ID is changed to "1005" indicating the service that is requested by the terminal 10aa.

At S50-1, the session control 58 selects, for the terminal 10aa that will use the reception service as a guest, a terminal 10 that can provide the reception service as an operator as a communication counterpart. For example, the session control 58 refers to the terminal management table (FIG. 7B) to select the terminal 10 having the contact ID stored in association with the service ID "1004" indicating the service type "reception" and the function "operator".

In the following, it is assumed that the terminal 10db is selected as a counterpart of the terminal 10aa. At S50-2, the data processor 59 searches the session management table (FIG. 7D) using the contact ID "01db" of the selected counterpart terminal 10db as a search key to obtain the session ID "sel" and the relay device ID "111e". Further, at S50-2, the data processor 59 refers to the session management table (FIG. 7D) to add to a record specified by the session ID "sel" and the relay device ID "111e", the contact ID "01aa" of the terminal 10aa as the terminal 10 that will participate in that session.

At S51, the transmitter/receiver 51 transmits relay device connection data, which is to be used for connecting the relay device 30e that is read at S50-2, to the terminal 10aa. The relay device connection data may include, for example, the IP address of the relay device 30e, authentication information to be used for authentication, a port number, and the session ID read at S50-2.

The terminal 10aa, which sends the service use request, connects with the relay device 30e using the relay device connection data transmitted from the management system 50. At S52, the terminal 10aa establishes a content data session "sed" with the relay device 30e. Through the session, the terminal 10aa is able to transmit to the relay device 30e various content data (image data and sound data) generated at the terminal 10aa.

Figure 13:
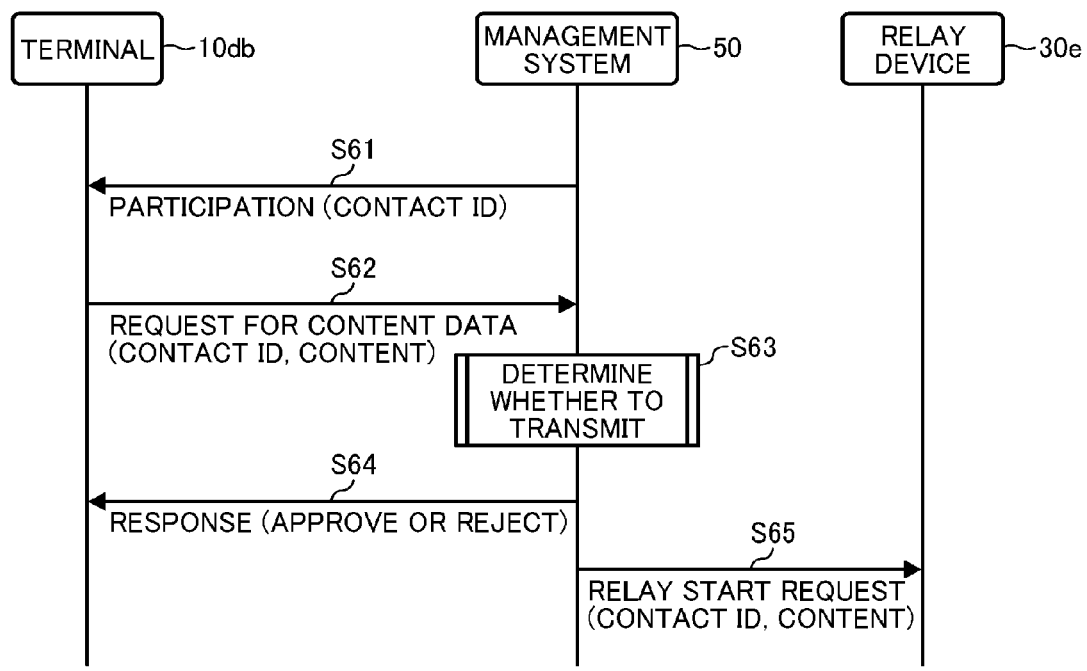
FIG. 13 is a data sequence diagram illustrating operation of processing a request for obtaining content data, according to an embodiment of the present invention.

Next, operation of processing a request for obtaining content data to be transmitted from the terminal 10*aa*, which is received from the terminal 10*db*, is described according to an embodiment of the present invention. This operation is performed after establishing the content data session "sed" between the terminal 10*aa* and the terminal 10*db* via the relay device 30*e*. FIG. 13 is a data sequence diagram illustrating operation of processing a request for obtaining content data.

After the terminal 10*aa* participates in the content data session "sed", at S61, the transmitter/receiver 51 of the management system 50 transmits a notification indicating that the terminal 10*aa* starts participating in the content data session that the terminal 10*db* is participating, to the terminal 10*db*. The notification includes the contact ID of the terminal 10*aa*.

At S62, the transmitter/receiver 21 of the terminal 10*db* transmits a request for obtaining content data from the terminal 10*aa*, to the management system 50. The request for content data includes the contact ID "01*db*" of the request sender terminal 10*db*, and the contact ID "01*aa*" of the data sender terminal 10*aa*. The request for content data further includes information regarding content data to be obtained, such as a type of content data, a resolution of content data, a frame rate, a bit rate, a sample rate, etc. The information regarding content data may be previously stored in the memory 1000 of the terminal 10*db* as described above referring to FIG. 11, or newly input by the user. Alternatively, the information regarding content data may be any information selected by the terminal 10*db*, from among information transmitted from the management system 50.

Figure 14:
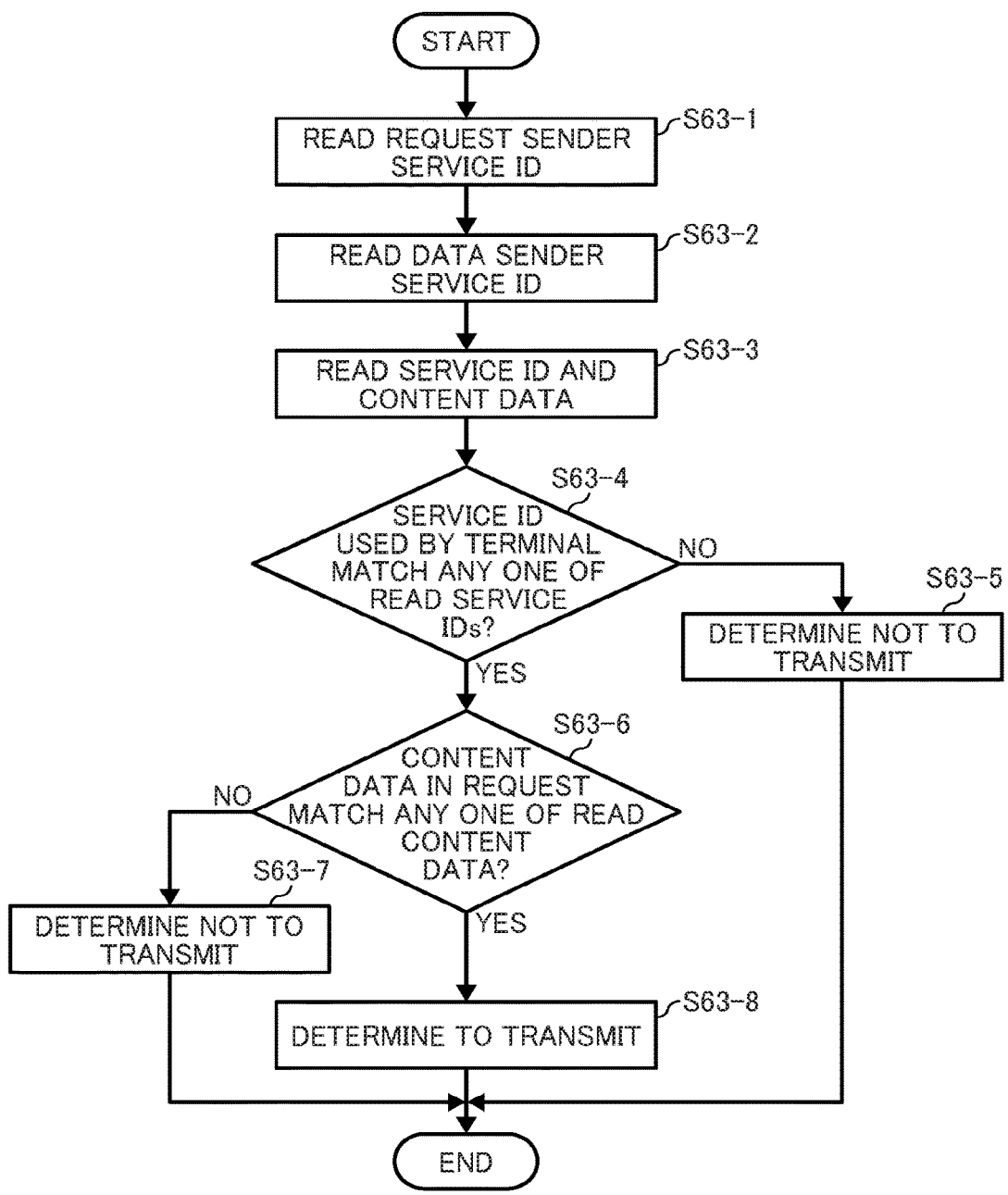
FIG. 14 is a flowchart illustrating operation of determining whether to transmit content data, according to an embodiment of the present invention.

When the transmitter/receiver 51 of the management system 50 receives the request for content data including information regarding content data, at S63, the session control 58 determines whether transmission of content data from the terminal 10*aa* to the terminal 10*db* is permitted, that is, whether to transmit content data from the terminal 10*aa* to the terminal 10*db*. Referring to FIG. 14, operation to be performed at S63 is described in detail. FIG. 14 is a flowchart illustrating operation of determining whether to transmit content data from the terminal 10*aa* to the terminal 10*db*.

At S63-1, the data processor 59 searches the terminal management table (FIG. 7B) using the contact ID "01*db*" of the terminal 10*db* that requests for content data as a search key to obtain the service ID "1004" associated with the contact ID "01*db*". At S63-2, the data processor 59 searches the terminal management table (FIG. 7B) using the contact ID "01*aa*" of the terminal 10*aa* serving as a content data sender as a search key to obtain the service ID "1005" associated with the contact ID "01*aa*".

At S63-3, the data processor 59 searches the transmission management table (FIG. 8B) using the service ID "1004" of the service being used by the terminal 10*db* as the request sender, obtained at S63-1, as a search key to read one or more sets of data sender service ID and content being stored in association with the request sender service ID "1004". In this embodiment, the data sender service ID "1005" and image data, and the data sender service ID "1005" and sound data are read.

At S63-4, the session control 58 determines whether the service ID of the service being used by the terminal 10*aa* as the data sender, which is obtained at S63-2, matches any one of the service IDs read at S63-3 using the service ID of the service being used by the terminal 10*db* as the request sender. When it is determined that the service ID of the service being used by the terminal 10*aa* (data sender) does not match any one of the service IDs read at S63-3 ("NO" at S63-4), the operation proceeds to S63-5. At S63-5, the session control 58 determines that transmission of content data from the terminal 10*aa* to the terminal 10*db* is not allowed. More specifically, this indicates that a transmission source of content data (data sender) is not using a service, which permits transmission of content data to a transmission destination (request sender) using a specific service. For example, the service being used by a transmission source of content data (data sender) is different from or incompatible to the service being used by a transmission destination (request sender).

When it is determined that the service ID of the service being used by the terminal 10*aa* (data sender) matches any one of the service IDs read at S63-3 ("YES" at S63-4), the operation proceeds to S63-6. At S63-6, the session control 58 determines whether content data specified by the request for obtaining matches any content data indicated by information regarding content data that is read at S63-3. When the content data in the request for obtaining does not match any one of content data read at S63-3 ("NO" at S63-3), the operation proceeds to S63-7. At S63-7, the session control 58 determines that transmission of content data from the terminal 10*aa* to the terminal 10*db* is not allowed. This indicates that a type of content data that is requested by the terminal 10*db* does not match a type of content data that can be transmitted from the terminal 10*aa*.

When the content data in the request for obtaining matches any one of content data read at S63-3 ("YES" at S63-3), the operation proceeds to S63-8. At S63-8, the session control 58 determines that transmission of content data from the terminal 10*aa* to the terminal 10*db* is allowed.

Referring back to FIG. 13, at S64, the transmitter/receiver 51 of the management system 50 transmits a response indicating whether content data can be transmitted, to the terminal 10*db* that sends the request for obtaining content data. When it is determined that content data can be transmitted, the transmitter/receiver 51 of the management system 50 obtains information regarding content data to be transmitted from the terminal 10*aa*, such as a resolution of content data, a frame rate, a bit rate, and sample rate. The transmitter/receiver 51 of the management system 50 may transmit information received from the relay device 30*e* to the terminal 10*db*, when transmitting the response to the request for obtaining content data, or transferring a response from the relay device 30*e* to a relay start request.

In case the management system 50 has a web server function, the transmitter/receiver 51 may send the HTTP status code "200" indicating approval of transmission of content data to the terminal 10*db*, or send the HTTP status code "403" or "406" indicating rejection of transmission of content data to the terminal 10*db*. The HTTP response may include a reason of rejection in the body.

When it is determined that content data cannot be transmitted at S63, the operation ends. In such case, content data is not transmitted in response to the request for obtaining. When it is determined that content data can be transmitted at S63, at S65, the transmitter/receiver 51 of the management system 50 transmits a relay start request for starting relay of content data to the relay device 30*e*. The relay start request includes the contact ID "01*db*" or the IP address of the terminal 10*db*, the contact ID "01*aa*" or the IP address of the terminal 10*aa*, and information regarding content data obtainable from the request for obtaining.

In case the relay device 30*e* fails to connect with the terminal 10*aa* or 10*db*, the relay device 30*e* sends an error message to the management system 50. In case the relay device 30e successfully connects with the terminal 10aa or 10db, the relay device 30e sends a message indicating that relaying of content data is started to the management system 50. The relay device 30e starts transmitting content data that matches the request from the terminal 10db, which may be selected from among content data transmitted from the terminal 10aa, to the terminal 10db.

As described above, the terminal 10aa transmits content data to the terminal 10db in response to a request for content data received from the terminal 10db. Since operation of transmitting content data from the terminal 10db to the terminal 10aa in response to the request for content data from the terminal 10aa may be performed in a substantially similar manner as described above referring to S61 to S65, description thereof is omitted.

Figure 15:
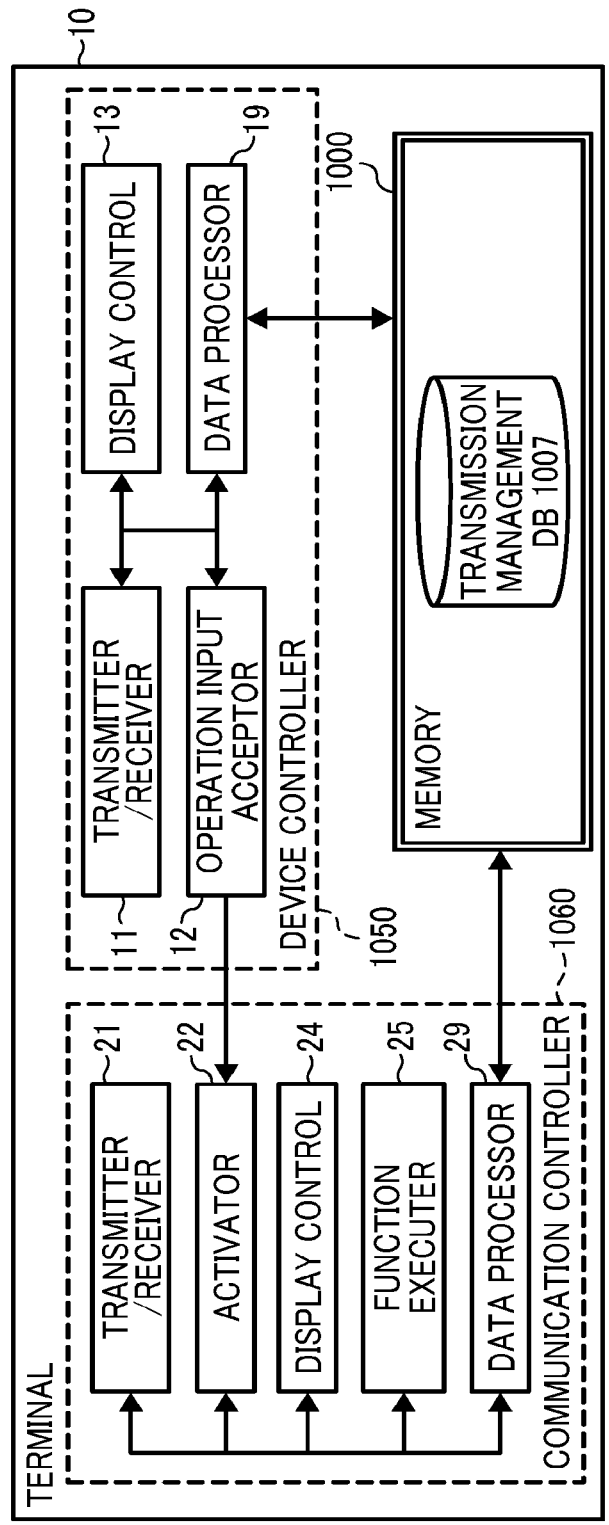
FIG. 15 is a schematic block diagram illustrating a functional configuration of the terminal of the communication system of FIG. 1 according to an embodiment of the present invention.
Figure 16:
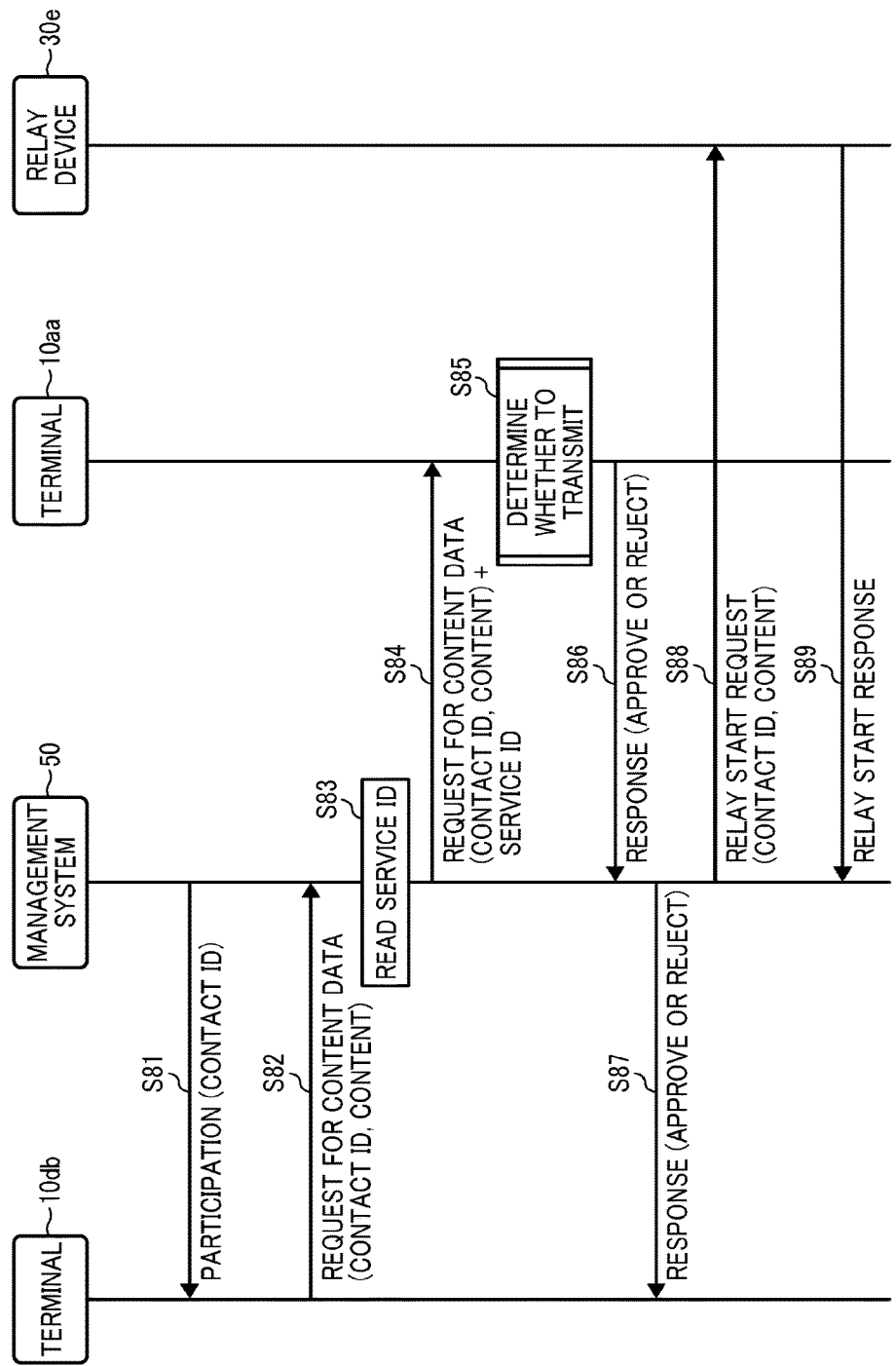
FIG. 16 is a data sequence diagram illustrating operation of processing a request for obtaining content data, according to an embodiment of the present invention.
Figure 17:
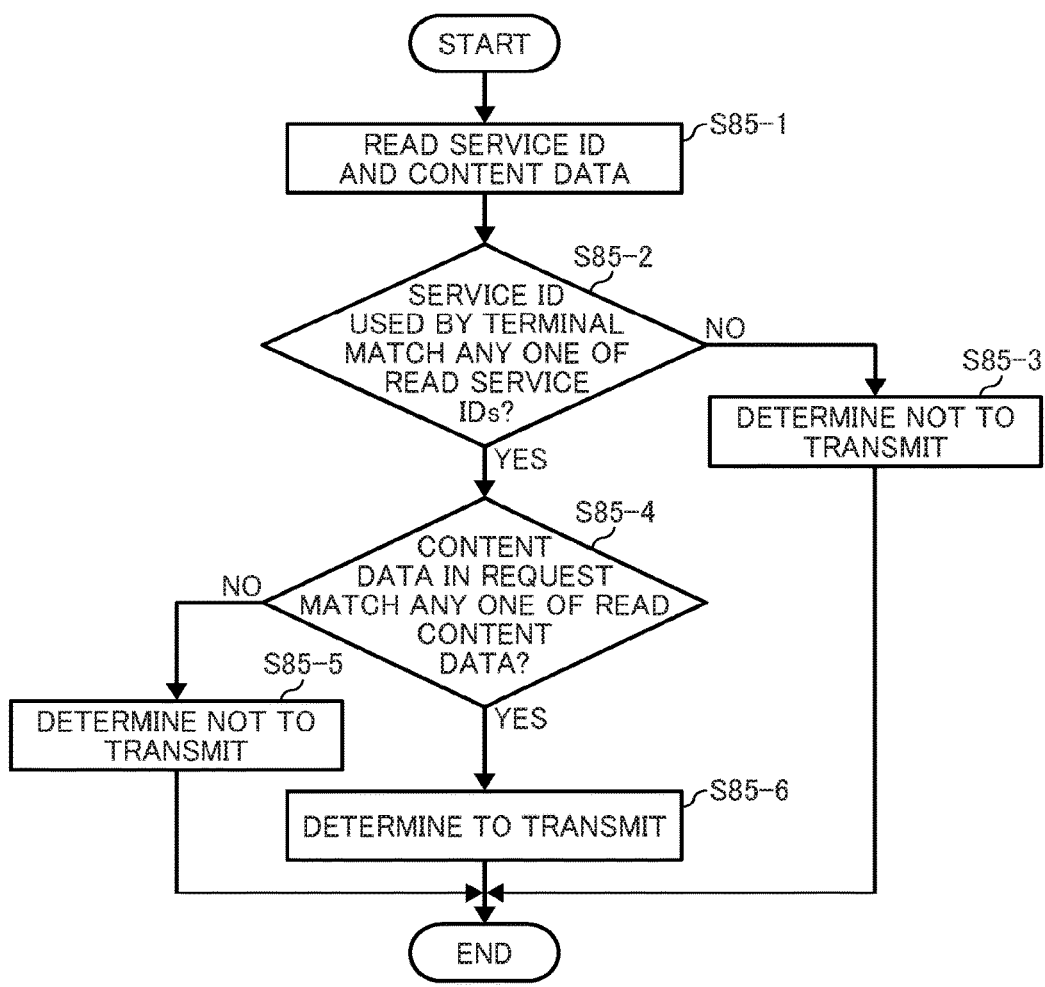
FIG. 17 is a flowchart illustrating operation of determining whether to transmit content data, according to an embodiment of the present invention.

Referring now to FIGS. 15 to 17, another embodiment of the present invention is described. FIG. 15 a schematic block diagram illustrating a functional configuration of a terminal 10, which may be provided in the communication system 1, according to the embodiment. In this embodiment, the transmission management table is stored in the memory 1000 of the terminal 10. More specifically, the memory 1000 stores a transmission management DB 1007, which may be implemented by a transmission management table. Since information stored in the transmission management table is substantially similar to that of the transmission management table (FIG. 8B) of the transmission management DB 5007, description thereof is omitted. However, in this embodiment, it is assumed that the transmission management table stores information regarding one or more services available for use by the local terminal 10. For example, in a substantially similar manner as described above referring to FIGS. 11 and 12, the terminal 10 may receive information regarding the request sender service ID, the data sender service ID, and the content data information for the service that can be used by the terminal 10, from the management system 50 in response to the service use request.

Now, operation of processing a request for content data from the terminal 10db is described according to an embodiment of the present invention. The operation is performed after establishing a content data session between the terminals 10db and 10aa, as described above referring to FIGS. 11 and 12. FIG. 16 is a data sequence diagram illustrating operation of processing a request for content data.

After the terminal 10aa participates in the content data session "sed", at S81, the transmitter/receiver 51 of the management system 50 transmits a notification indicating that the terminal 10aa participates in the content data session "sed" to the terminal 10db. The notification includes the contact ID of the terminal 10aa.

At S82, the transmitter/receiver 21 of the terminal 10db transmits a request for content data to be transmitted from the terminal 10aa to the management system 50. The request for content data includes the contact ID "01db" of the request sender terminal 10db, and the contact ID "01aa" of the data sender terminal 10aa. The request for content data further includes information regarding content data that can be transmitted, such as a type of content data, a resolution of content data, a frame rate, a bit rate, a sample rate, etc.

When the transmitter/receiver 51 of the management system 50 receives the request for content data, at S83, the data processor 59 searches the terminal management table (FIG. 7B) using the contact ID "01db" of the terminal 10db that requests for content data as a search key to obtain the service ID "1004" associated with the contact ID "01db". Further, at S83, the data processor 59 searches the terminal management table (FIG. 7B) using the contact ID "01aa" of the terminal 10aa serving as a content data sender as a search key to obtain the service ID "1005" associated with the contact ID "01aa".

At S84, the transmitter/receiver 51 of the management system 50 transmits to the terminal 10aa, in response to the request for content data from the terminal 10db, the request for content data received from the terminal 10db, the service ID "1004" of the service being used by the terminal 10db (request sender), and the service ID "1005" of the service being used by the terminal 10aa (data sender).

When the transmitter/receiver 21 of the terminal 10aa receives the request for content data and the service IDs, at S85, the function executor 25 determines whether content data can be transmitted from the terminal 10aa to the terminal 10db. Referring to FIG. 17, operation at S85 is described in detail. FIG. 17 is a flowchart illustrating operation of determining whether to transmit content data from the terminal 10aa to the terminal 10db.

At S85-1, the data processor 29 searches the transmission management table (FIG. 8B) using the service ID "1004" of the service being used by the terminal 10db, transmitted from the management system 50, as a search key to read one or more sets of data sender service ID and content being stored in association with the request sender service ID "1004". In this embodiment, the data sender service ID "1005" and image data, and the data sender service ID "1005" and sound data are read.

At S85-2, the function executor 25 determines whether the service ID of the service being used by the terminal 10aa (data sender), transmitted from the management system 50, matches any one of the service IDs read at S85-1 using the service ID of the service being used by the terminal 10db (request sender). When it is determined that the service ID of the service being used by the terminal 10aa does not match any one of the service IDs read at S85-1 ("NO" at S85-2), the operation proceeds to S85-3. At S85-3, the function executor 25 determines that transmission of content data from the terminal 10aa to the terminal 10db is not allowed.

When it is determined that the service ID of the service being used by the terminal 10aa matches any one of the service IDs read at S85-1 ("YES" at S85-2), the operation proceeds to S85-4. At S85-4, the function executor 25 determines whether content data specified by the request for obtaining matches any content data indicated by information regarding content data read at S85-1. When the content data in the request for obtaining does not match any one of content data read at S85-1 ("NO" at S85-4), the operation proceeds to S85-5. At S85-5, the function executor 25 determines that transmission of content data from the terminal 10aa to the terminal 10db is not allowed.

When the content data in the request for obtaining matches any one of content data read at S85-1 ("YES" at S85-4), the operation proceeds to S85-6. At S85-6, the function executor 25 determines that transmission of content data from the terminal 10aa to the terminal 10db is allowed.

Referring back to FIG. 16, at S86, the transmitter/receiver 21 transmits a response indicating whether content data can be transmitted, to the management system 50 based on determination at S85. Since operation of S87 and S89 is performed in a substantially similar manner as described above referring to S64 and S66 of FIG. 13, description thereof is omitted.

Figure 18:
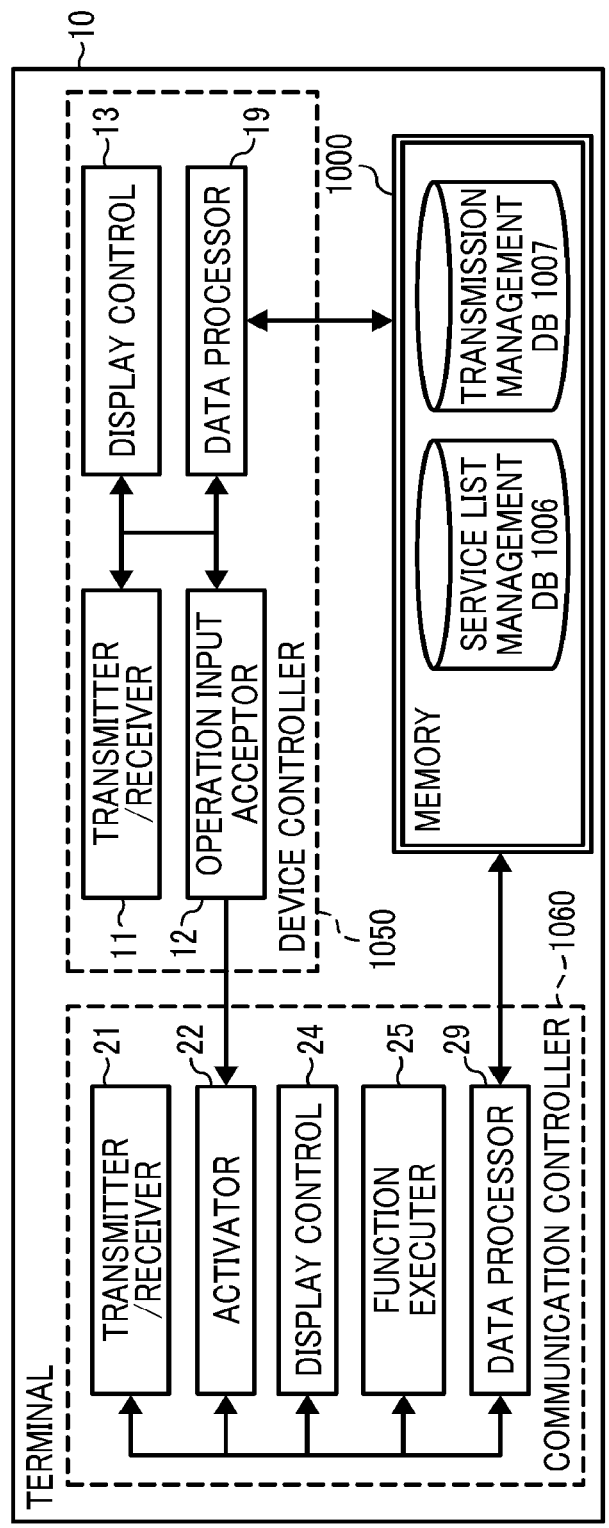
FIG. 18 is a schematic block diagram illustrating a functional configuration of the terminal of the communication system of FIG. 1 according to an embodiment of the present invention.

Referring now to FIGS. 18 and 19, another embodiment of the present invention is described. FIG. 18 is a schematic block diagram illustrating a functional configuration of a terminal 10, which may be provided in the communication system 1, according to the embodiment of the present invention. In this embodiment, a service list management table is stored in the memory 1000 of the terminal 10 in addition to the transmission management table. More specifically, the memory 1000 stores a service list management DB 1006, which may be implemented by the service list management table. Since information stored in the service list management table of the service list management DB 1006 is substantially similar to that of the service list management table (FIG. 8A), description thereof is omitted. However, in this embodiment, it is assumed that the service list management table stores the service ID, the service type information, and the function information, for each one of the services available for use by the local terminal 10. In such case, the terminal 10 may use the service list management table, which is locally managed in the memory 1000, to manage information regarding the service to be used by the terminal 10, such as the service ID, based on the requested service type and the function.

Now, operation of processing a request for content data from the terminal 10db is described according to an embodiment of the present invention. The operation is performed after establishing a content data session between the terminals 10db and 10aa, as described above referring to FIGS. 11 and 12. FIG. 19 is a data sequence diagram illustrating operation of processing a request for obtaining content data.

Further, in this embodiment, the terminal 10 is able to send a request for obtaining content data to a system different from the management system 50 of FIG. 1 or directly without transferring the request for content data to the management system 50, although the same numeral is used for the management system 50 in FIG. 19, depending on whether the terminal 10 knows a communication destination, as the management system 50 just transfers such request for content data.

After the terminal 10aa participates in the content data session "sed", at S101, the transmitter/receiver 51 of the management system 50 transmits a notification indicating that the terminal 10aa starts participating in the content data session to the terminal 10db. The notification includes the contact ID of the terminal 10aa.

At S102, the transmitter/receiver 21 of the terminal 10db transmits a request for obtaining content data from the terminal 10aa, and the service ID of the service being used by the terminal 10db, to the management system 50. The request for content data includes the contact ID "01db" of the request sender terminal 10db, and the contact ID "01aa" of the data sender terminal 10aa. The request for content data further includes information regarding content data that can be transmitted, such as a type of content data, a resolution of content data, a frame rate, a bit rate, a sample rate, etc.

When the transmitter/receiver 51 of the management system 50 receives the request for content data and the service ID, at S103, the management system 50 transmits the request for content data and the service ID to the terminal 10aa.

When the transmitter/receiver 21 of the terminal 10aa receives the request for content data and the session ID, at S104, the function executor 25 determines whether content data can be transmitted from the terminal 10aa to the terminal 10db, in a substantially similar manner as described above referring to S85 of FIG. 16. In this embodiment, the management system 50 does not transmit the service ID of the service being used by the terminal 10aa as the data sender. For this reasons, the terminal 10aa determines whether transmission of content data is allowed from the terminal 10aa to the terminal 10db, using the service ID that is locally managed at the terminal 10aa.

Since operation of S105 to S108 is performed in a substantially similar manner as described above referring to S86 to S89, description thereof is omitted.

As described above, in some embodiments of the present invention, the management system 50 controls transmission of content data among a plurality of communication terminals 10. The transmission management DB 5007 or 1007 manages, a first service ID (an example of service identification information) for identifying a service to be used by a first terminal 10 as a request sender, a second service ID for identifying a service to be used by a second terminal 10 as a data sender, and content data information regarding content data to be transmitted to the first terminal 10, in association with one another.

When a content data session for transmitting content data is established between at least the first terminal and the second terminal, a session control 58 of the management system 50 or a function executor 25 of the terminal 10 controls transmission of content data from the second terminal 10 to the first terminal 10, such that the content data having property indicated by the content data information associated with the first service ID and the second service ID is transmitted from the second terminal 10 to the first terminal 10.

With the content data information indicating content data allowed to be transmitted, even when the first terminal 10 and/or the second terminal 10 communicates using a specific service having its function being customized for each user, the second terminal 10 as a communication counterpart of the first terminal 10 is able to transmit content data that is compatible to the first terminal 10 using the specific service. This may prevent occurrence of error in data transmission.

Further, content data that can be transmitted to the first terminal 10 may be freely set depending on a combination of the service to be used by the first terminal 10 and the service to be used by the second terminal 10. For example, when the services used by the first and second terminals 10 are provided by different service providers, content data that can be transmitted from the first terminal 10 to the second terminal 10 may be restricted, thus improving security.

In one example, the transmitter/receiver 51 receives a request for using a specific service from at least the first terminal 10. The transmitter/receiver 51 of the session control 58 controls transmission of content data using the first service identification information obtained from the request, in response to the service use request.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the terminal 10 may be implemented by one or more computers, which is capable of communicating content data. Further, any memory in the communication system may be provided in any desired terminal, device, or apparatus.

The relay devices 30, the management system 50, the program providing system 90, and the maintenance system 100 in the above-described embodiment may be configured by a single computer or a plurality of computers to which divided portions (functions) are arbitrarily allocated. In the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal control program, the relay device control program, or the communication management program in the above-described embodiment, the HD 204 storing these programs (separately or entirety), and the program providing system 90 including the HD 204 are used as program products in the case of providing the terminal control program, the relay device program, and the communication management program to users within a certain country or outside that country.

In the above-described embodiment, the terminal management table of FIG. 7B stores the terminal IP address, as terminal identification information. Alternatively, the fully qualified domain name (FQDN) of each terminal 10 may be managed as long as an FQDN serves as terminal identification information for identifying each terminal 10 on the communication network 2. In this case, an IP address corresponding to an FQDN is obtained by a Domain Name System (DNS) server.

In the above-described embodiment, a videoconference system is used as an example of the communication system 1 (including 1A and 1B). Alternatively, the communication system may be a car navigation system. In such case, the terminal 10 at one end may correspond to a car navigation system mounted on one automobile, and the terminal 10 at the other end may correspond to a management terminal or a management server at the management center for managing the car navigation system, or a car navigation system mounted on the other automobile.

The other examples of the communication system 1 include a teleconference system, a personal computer image sharing system, a telephone system including the Internet Protocol (IP) phone, Internet phone, or mobile phone. In the telephone system, the telephone operates as the communication terminal 10.

In addition, although image data and sound data are described as examples of content data in the above-described embodiment, the content data is not limited to these items of data. The content data is preferably used as a medium of real-time communication. Examples of content data include, but not limited to, image data such as a still image or a video image, sound data, and streaming data such as shared screen data, message, stroke data, or instruction or operation data. Alternatively, the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

Further, in some embodiments, when the communication system 1 is used as a remote medical diagnosis system, the content data may be sound data that reflects pulse or beat generated within a human body, image data of electrocardiogram, coordinate data that shows a trend in body temperature, or any other data that may be used to examine the patient.

Note that the terminal 10 may be used not only for communication between different offices or for communication between different rooms in the same office, but also for communication within the same room or for outdoor-indoor communication or outdoor-outdoor communication. In the case where the terminal 10 is used outside, wireless communication using a mobile phone communication network or the like is performed.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication management system, comprising:
a first memory that stores first service identification information identifying a first service to be used by a first communication terminal that requests for content data, second service identification information identifying a second service to be used by a second communication terminal that transmits the content data, and content data information indicating a property of the content data that can be transmitted to the first communication terminal, in association with one another;

processing circuitry that controls transmission of the content data from the second communication terminal to the first communication terminal after a session for transmitting the content data is established between the first communication terminal and the second communication terminal, so as to transmit the content data having the property indicated by the content data information that is stored in association with the first service identification information and the second service identification information a receiver that receives a request for using a specific service, from at least one of the first communication terminal and the second communication terminal, before the session for transmitting the content data is established; and a transmitter that transmits a response including the content data information to the at least one of the first communication terminal and the second communication terminal that sends the request for using the specific service, wherein the system includes a second memory that stores, for each one of a plurality of services managed by the communication management system, service identification information identifying the service, service type information indicating a type of the service, and function information indicating a role of the communication terminal when using the service, the request for using the service includes service type information and function information of the specific service that the first communication terminal requests, and the processing circuitry obtains, from the second memory, service identification information identifying the specific service using the service type information and the function information of the request, as the first service identification information.

2. The communication management system of claim 1, wherein the receiver further receives a request for obtaining the content data from the first communication terminal after the session is established, and the processing circuitry controls transmission of the content data from the second communication terminal to the first communication terminal in response to the request for obtaining the content data.

3. The communication management system of claim 2, wherein the first memory further stores the first service identification information and the second service identification information in association with identification information identifying the first communication terminal and identification information identifying the second communication terminal, respectively, in response to the request for using the specific service, and the processing circuitry obtains the first service identification information and the second service identification information, from the first memory using identification information obtainable from the request for the content data, and further obtains the content data information to be used for controlling transmission of the content data using the obtained first service identification information and second service identification information.

4. A communication system, comprising:
the communication management system of claim 1; and
a relay device configured to relay the content data between the first communication terminal and the second communication terminal, wherein the communication management system transmits a request for starting relay of the content data including the content data information associated with the first service identification information and the second identification information.

5. A communication system, comprising:
the communication management system of claim 1; and
the second communication terminal including:
a terminal memory that stores the content data information indicating the property of the content data that can be transmitted to the first communication terminal in association with the first service identification information and the second identification information;
a terminal receiver that receives the request for obtaining the content data from the first communication terminal via the communication management system, the request for obtaining the content data being received with the first service identification information and the second service identification information; and
terminal processing circuitry that obtains the content data information associated with the first service identification information and the second identification information, and determines whether to approve the request for obtaining the content data using the obtained content data information.

6. A communication system, comprising:
the communication management system of claim 1; and
the second communication terminal including:
a terminal memory that stores (1) the content data information indicating the property of the content data that can be transmitted to the first communication terminal in association with the first service identification information and the second identification information, and (2) service identification information for identifying each one of one or more services that can be used by the second communication terminal;
a terminal receiver that receives the request for obtaining the content data from the first communication terminal via the communication management system, the request for obtaining the content data being received with the first service identification information and the second service identification information; and
terminal processing circuitry that obtains the content data information associated with the first service identification information and the second identification information, and determines whether to approve the request for obtaining the content data using the obtained content data information.

7. A method of controlling transmission of content data, comprising:
storing, in a first memory, first service identification information identifying a first service to be used by a first communication terminal that requests for content data, second service identification information identifying a second service to be used by a second communication terminal that transmits the content data, and content data information indicating a property of the content data that can be transmitted to the first communication terminal, in association with one another; and controlling transmission of the content data from the second communication terminal to the first communication terminal after a session for transmitting the content data is established between the first communication terminal and the second communication terminal, so as to transmit the content data having the property indicated by the content data information that is stored in association with the first service identification information and the second service identification information, wherein the method further includes receiving a request for using a specific service, from at least one of the first communication terminal and the second communication terminal, before the session for transmitting the content data is established;

transmitting a response including the content data information to the at least one of the first communication terminal and the second communication terminal that sends the request for using the specific service;

storing, in a second memory, for each one of a plurality of services available for use, service identification information identifying the service, service type information indicating a type of the service, and function information indicating a role of a communication terminal when using the service, the communication terminal being the first communication terminal or the second communication terminal; and obtaining, from the second memory, service identification information identifying the specific service using service type information and function information included in the request for using the service, as the first service identification information.

8. The method of claim 7, further comprising:

receiving a request for obtaining the content data from the first communication terminal after the session is established, wherein the controlling transmission of the content data from the second communication terminal to the first communication terminal is performed in response to the request for obtaining the content data.

9. The method of claim 8, further comprising:

storing the first service identification information and the second service identification information in association with identification information identifying the first communication terminal and identification information identifying the second communication terminal, respectively, in the first memory, in response to the request for using the specific service;

obtaining the first service identification information and the second service identification information, from the first memory using identification information obtainable from the request for the content data; and obtaining the content data information to be used for controlling transmission of the content data using the obtained first service identification information and second service identification information.

10. A communication terminal, comprising:

a memory that stores first service identification information identifying a first service to be used by a first communication terminal that requests for content data, second service identification information identifying a second service to be used by a second communication terminal that transmits the content data, and content data information indicating a property of the content data that can be transmitted to the first communication terminal, in association with one another;

a receiver that receives a request for obtaining the content data from a counterpart communication terminal operating as the first communication terminal, the request for obtaining the content data being received with at least the first service identification information identifying a specific service being used by the counterpart communication terminal operating as the first communication terminal; and processing circuitry that obtains content data information associated with the first service identification information and the second service identification information, and determines whether to approve the request for obtaining the content data using the obtained content data information.

11. The communication terminal of claim 10, wherein the receiver further receives the second service identification information identifying a specific service being used by the communication terminal operating as the second communication terminal.

12. The communication terminal of claim 10, wherein the memory further stores service identification information identifying each one of one or more services that can be used by the communication terminal, and the processing circuitry obtains, from the memory, the second service identification information identifying a specific service being used by the communication terminal operating as the second communication terminal.

* * * * *